United States Patent [19]
Geller et al.

[11] Patent Number: 5,091,861
[45] Date of Patent: Feb. 25, 1992

[54] SYSTEM FOR AUTOMATIC FINISHING OF MACHINE PARTS

[75] Inventors: Yair Geller, Ramat Gan; Michael Berman, Bnei Brak; Orit Katsav, Ramat Gan, all of Israel

[73] Assignee: N.C.T. Ltd., Givataim, Israel

[21] Appl. No.: 427,687

[22] Filed: Oct. 25, 1989

[30] Foreign Application Priority Data

Mar. 3, 1989 [IL] Israel ............................... 89484

[51] Int. Cl.⁵ ............................................. G06F 15/46
[52] U.S. Cl. ........................ 364/474.34; 364/474.18; 364/474.35
[58] Field of Search ........... 364/474.18, 474.2, 474.24, 364/474.28, 474.32, 474.34, 474.35, 474.01, 191, 192, 518, 521, 522, 474.14

[56] References Cited

U.S. PATENT DOCUMENTS

| | | | |
|---|---|---|---|
| 3,633,011 | 1/1972 | Bederman et al. | 364/474.34 |
| 4,513,366 | 5/1985 | Munekata | 364/167 |
| 4,530,046 | 7/1985 | Munekata | 364/191 |
| 4,533,286 | 8/1985 | Kishi et al. | 409/80 |
| 4,604,705 | 8/1986 | Imanishi | 364/474.34 |
| 4,736,306 | 4/1988 | Christensen et al. | 364/513 |
| 4,837,703 | 6/1989 | Kakazu et al. | 364/474.18 |
| 4,868,761 | 9/1989 | Hayashi | 364/474.24 |
| 4,907,164 | 3/1990 | Guyder | 364/474.15 |
| 4,942,611 | 7/1990 | Kunugi et al. | 364/474.06 |
| 4,951,217 | 8/1990 | Clack et al. | 364/474.2 |
| 4,974,165 | 11/1990 | Locke et al. | 364/474.35 |

*Primary Examiner*—Jerry Smith
*Assistant Examiner*—Paul Gordon
*Attorney, Agent, or Firm*—Nixon & Vanderhye

[57] ABSTRACT

A system for automatic finishing of machined parts comprising apparatus for defining a workpiece and finishing parameters thereof corresponding to a finishing task, apparatus for calcualting a three-dimensional path about the workpiece along which a finishing tool is drawn in order to perform the finishing task, apparatus for testing the placement of the workpiece and for correcting the three-dimensional path to account for workpiece misplacement, and finishing apparatus operative to move the finishing tool along the three dimensional path in order to perform the finishing task.

25 Claims, 22 Drawing Sheets

SH. 1 OF 2

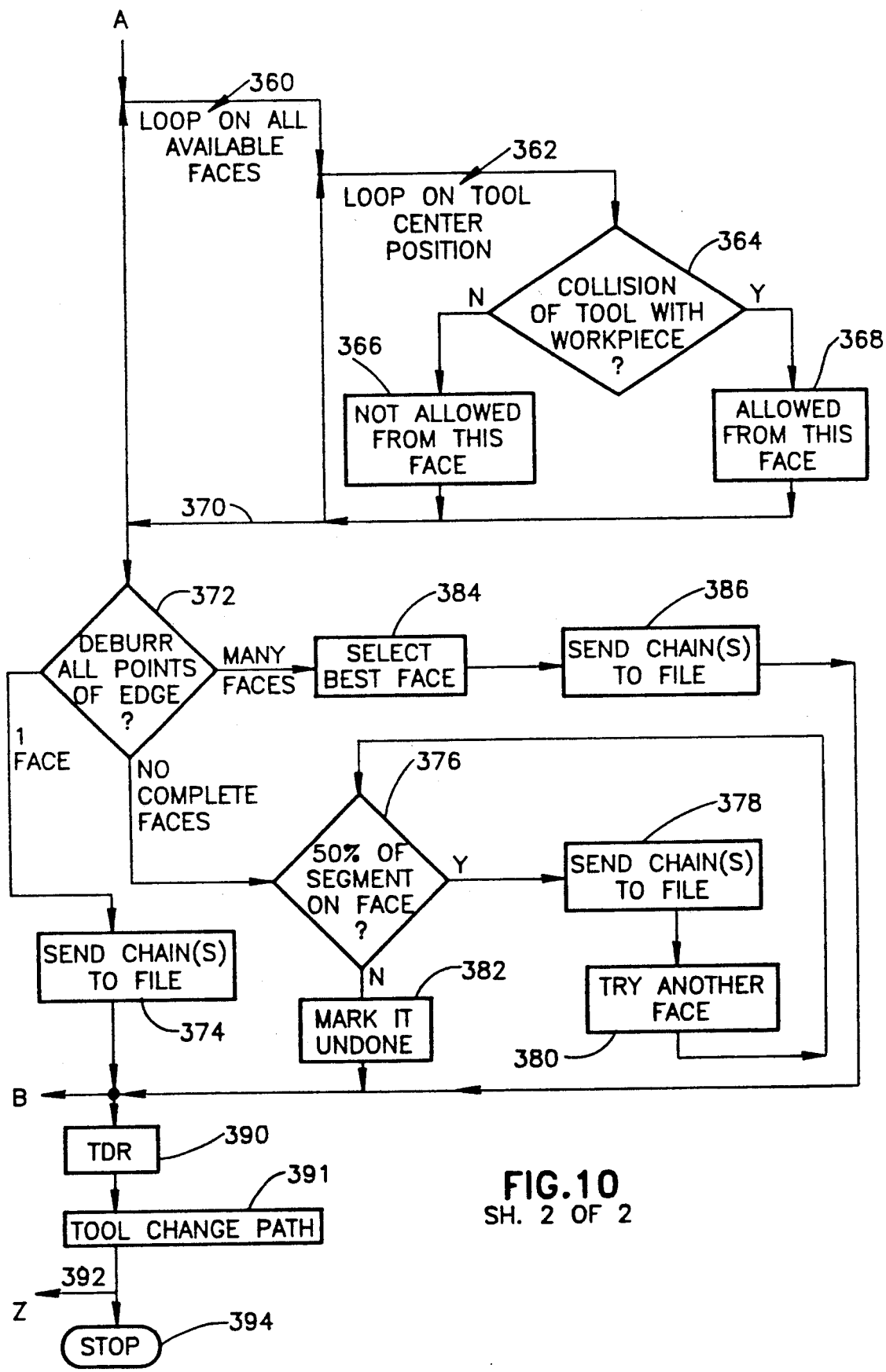

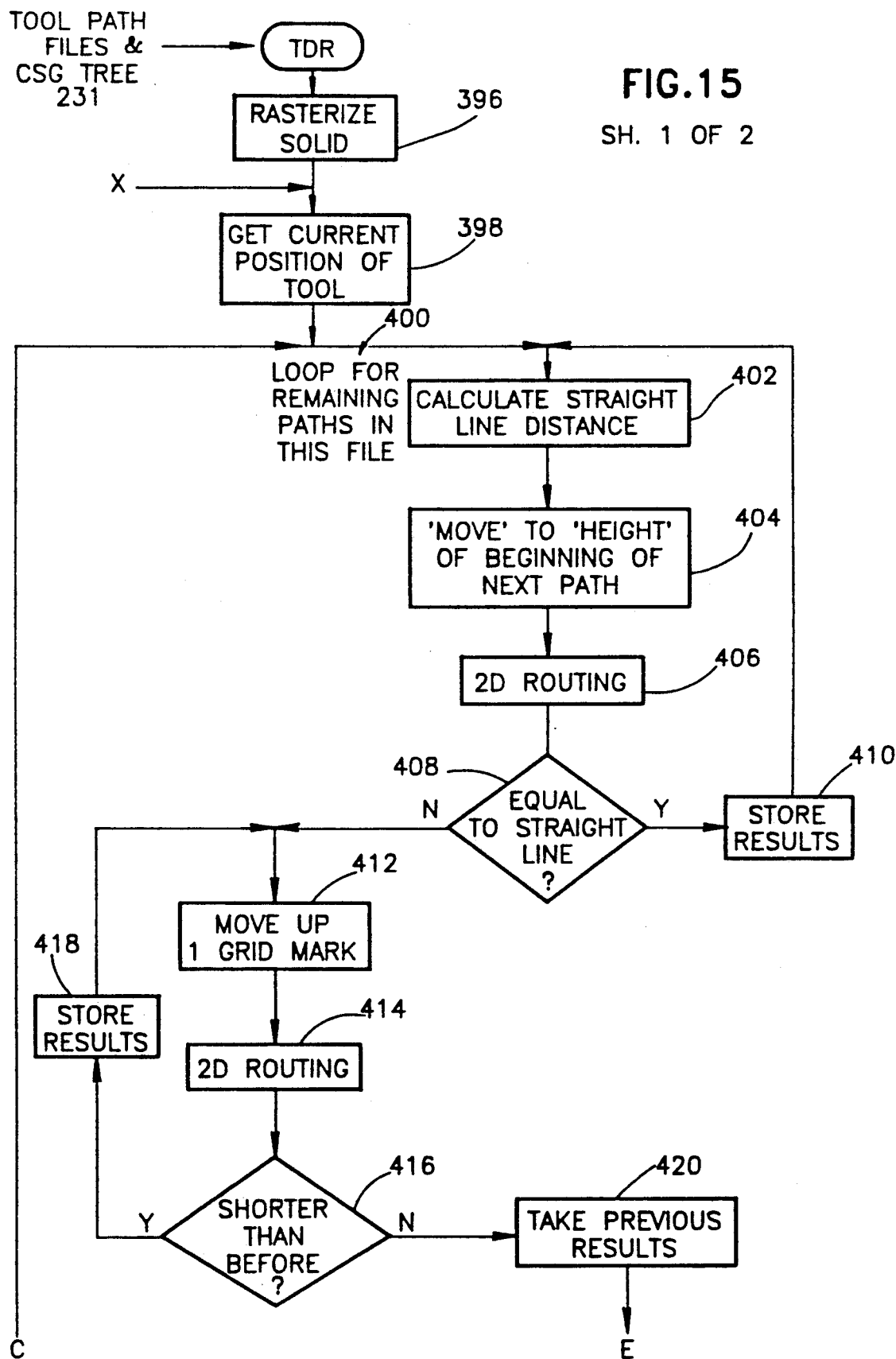

SH. 2 OF 2

SYSTEM FOR AUTOMATIC FINISHING OF MACHINE PARTS

FIELD OF INVENTION

The present invention relates to numerically controlled machining centers generally and more particularly to numerically controlled machining centers for finishing tasks on machined metal parts.

BACKGROUND OF THE INVENTION

Industrial deburring techniques have been known since at least the beginning of the Industrial Revolution. A very common technique is that of manual deburring which is time-and cost-intensive. Consequently, other techniques have been developed in an attempt to reduce costs and include barrel tumbling, centrifugal barrel tumbling, spindle finishing, vibratory deburring, abrasive-jet deburring, water-jet deburring, brush deburring, sanding, chemical deburring, and others. A discussion of each of the above mentioned deburring techniques, and others not mentioned hereinabove, is found in Deburring Technology for Improved Manufacturing, written and edited by LaRoux K. Gillespie, Society of Manufacturing Engineers, 1981. Automatic, computerized systems for deburring are not known to the inventors.

Automatic systems for some machining tasks have been developed. U.S. Pat. No. 4,618,924 discloses an automatic milling system using constructive solid geometry modeling. A solid model of the part to be milled is defined and a path which the milling tool will follow is automatically generated. The tool path is created by replacing every primitive shape included in the solid model of the part and replacing it with an offset primitive, larger or smaller than the part by the cutter radius. As mentioned in the patent disclosure, the milling method will leave material according to the natural scallop height between passes and where the cutter cannot penetrate the part due to its radius.

SUMMARY OF THE INVENTION

The present invention seeks to provide an automatic, computerized finishing system for machined workpieces, which performs, in particular, deburring tasks.

There is thus provided in accordance with a preferred embodiment of the present invention a system for automatic finishing of machined parts comprising apparatus for defining a workpiece and finishing parameters thereof corresponding to a finishing task, apparatus for calculating a three-dimensional path about the workpiece along which a finishing tool is drawn in order to perform the finishing task, apparatus for testing the placement of the workpiece and for correcting the three-dimensional path to account for workpiece misplacement, and finishing apparatus operative to move the finishing tool along the three dimensional path in order to perform the finishing task.

According to a preferred embodiment of the invention, the apparatus for defining comprises a solid modeller, often utilizing a Constructive Solid Geometry modeller, and a process planner.

According to a preferred embodiment of the invention, the apparatus for testing and correcting includes apparatus for defining a plurality of reference surfaces and reference points on an ideally placed workpiece, apparatus for calculating an ideal position and orientation from the coordinates of the reference points of the ideally placed workpiece, apparatus for probing a misplaced workpiece at or near the reference points, thereby defining a plurality of measured reference points, apparatus for calculating a measured position and orientation from the coordinates of the measured reference points and apparatus for calculating a correction matrix based upon the transformations necessary to transform the ideal position and orientation into the measured position and orientation.

Further, according to a preferred embodiment of the invention, the apparatus for calculating a three-dimensional path include apparatus for interpolating, for a given tool, each of a multiplicity of edges into a plurality of edge positions, apparatus for calculating, for the tool and for each edge, a tool position at each of the plurality of edge positions thereby producing an edge tool path for each edge, apparatus for selecting an approach direction most appropriate for finishing each of the multiplicity of edges with the tool where a null direction is an appropriate selection if an edge cannot be finished by the tool, apparatus for repeating the steps of interpolating, calculating and selecting with a set of tools until the entirety of edges have approach directions matched to them and apparatus for building a three-dimensional path which connects together each of the edge tool paths matched to the approach directions into a complete path around the workpiece which includes paths for tool changes. The appropriate approach direction is one wherein the given tool, at any of the tool positions of an edge tool path, does not collide with the workpiece, and wherein the given tool can operate at an average surface speed which is correct for the apparatus for finishing.

Still further, according to a preferred embodiment of the invention, the apparatus for building includes apparatus for rasterizing a model of the workpiece, apparatus for choosing a first tool location of a connecting path from the end of a previous edge tool path to the beginning of a candidate next edge tool path, from a given approach direction, as the location whose coordinate in the approach direction is equivalent to the value of the respective coordinate of the beginning location of the candidate next edge, and the remaining coordinates are equivalent to their respective values in the final location of the previous tool edge, apparatus for performing a standard two-dimensional routing from the first tool location of the connecting path to the beginning location of the candidate next edge, apparatus for comparing the results of the steps of choosing and performing against a straight line path between the end of the previous edge tool path to the beginning of the candidate next edge tool path and choosing a first location which is one raster step away from the previous first location, in the opposite approach direction, if the straight line path is shorter, apparatus for repeating the steps of performing and comparing until the connecting tool path is as short as possible, apparatus for smoothing the shortest connecting tool path, apparatus for choosing a shortest candidate connecting tool path and apparatus for repeating the steps of choosing, performing, comparing, repeating, smoothing, and choosing again, with each of a multiplicity of approach directions.

Additionally, according to a prefereed embodiment of the invention, the apparatus for performing the finishing task comprises a five-dimensional motion assembly and wherein the fifth-axis assembly is removable and contains a wholly enclosed motor system. According to a preferred embodiment of the invention, the apparatus for performing the finishing task includes a tool magazine and interchangeable tools. The tool magazine holds the interchangeable tools in two tool beds which rotate together. The tool magazine has a cover thereby to protect the interchangeable tools from metal dust and grit.

Further, according to a preferred embodiment of the invention, the apparatus for performing the finishing task includes a workpiece holder which holds 16 workpieces where each workpiece is separately held by a clamp. The clamp has a stationary lower half and a movable upper half where the upper half is moved by a handle working against springs which, in the resting position, forces the upper half into the clamped position.

There is provided in accordance with a preferred embodiment of the present invention, a method for automatic finishing of machined parts comprising the steps of defining a workpiece and finishing parameters thereof corresponding to a finishing task, calculating a three-dimensional path about the workpiece along which a finishing tool is drawn in order to perform the finishing task, testing the placement of the workpiece and for correcting the three-dimensional path to account for workpiece misplacement and moving finishing means along the three dimensional path to perform the finishing task. The step of defining comprise a solid modeller, utilizing a Constructive Solid Geometry modeller, and a process planner.

Additionally, according to a preferred embodiment of the invention, the step of testing and correcting includes the steps of defining a plurality of reference surfaces and reference points on an ideally placed workpiece, calculating an ideal position and orientation from the coordinates of the reference points of the ideally placed workpiece, probing a misplaced workpiece at or near the reference points, thereby defining a plurality of measured reference points, calculating a measured position and orientation from the coordinates of the measured reference points and calculating a correction matrix based upon the transformations necessary to transform the ideal position and orientation into the measured position and orientation.

Further, according to a preferred embodiment of the invention, the step of calculating a three-dimensional path include the steps of interpolating, for a given tool, each of a multiplicity of edges into a plurality of edge positions, calculating, for the tool and for each edge, a tool position at each of the plurality of edge positions thereby producing an edge tool path for each edge, selecting an approach direction most appropriate for finishing each of the multiplicity of edges with the tool where a null direction is an appropriate selection if an edge cannot be finished by the tool, repeating the steps of interpolating, calculating and selecting with a set of tools until the entirety of edges have approach directions matched to them, and building a three-dimensional path which connects together each of the edge tool paths matched to the approach directions into a complete path around the workpiece which includes paths for tool changes.

Still further, according to a preferred embodiment of the invention, the step of building includes the steps of rasterizing a model of the workpiece, choosing a first tool location of a connecting path from the end of a previous edge tool path to the beginning of a candidate next edge tool path, from a given approach direction, as the location whose coordinate in the approach direction is equivalent to the value of the respective coordinate of the beginning location of the candidate next edge, and the remaining coordinates are equivalent to their respective values in the final location of the previous tool edge, performing a standard two-dimensional routing from the first tool location of the connecting path to the beginning location of the candidate next edge, comparing the results of the steps of choosing and performing against a straight line path between the end of the previous edge tool path to the beginning of the candidate next edge tool path and choosing a first location which is one raster step away from the previous first location, in the opposite approach direction, if the straight line path is shorter, repeating the steps of performing and comparing until the connecting tool path is as short as possbile smoothing the shortest connecting tool path, choosing a shortest candidate connecting tool path and repeating the steps of choosing, performing, comparing, repeating, smoothing, and choosing again, with each of a multiplicity of approach directions.

DETAILED DESCRIPTION OF A PREFERRED EMBODIMENT

Figure 1:
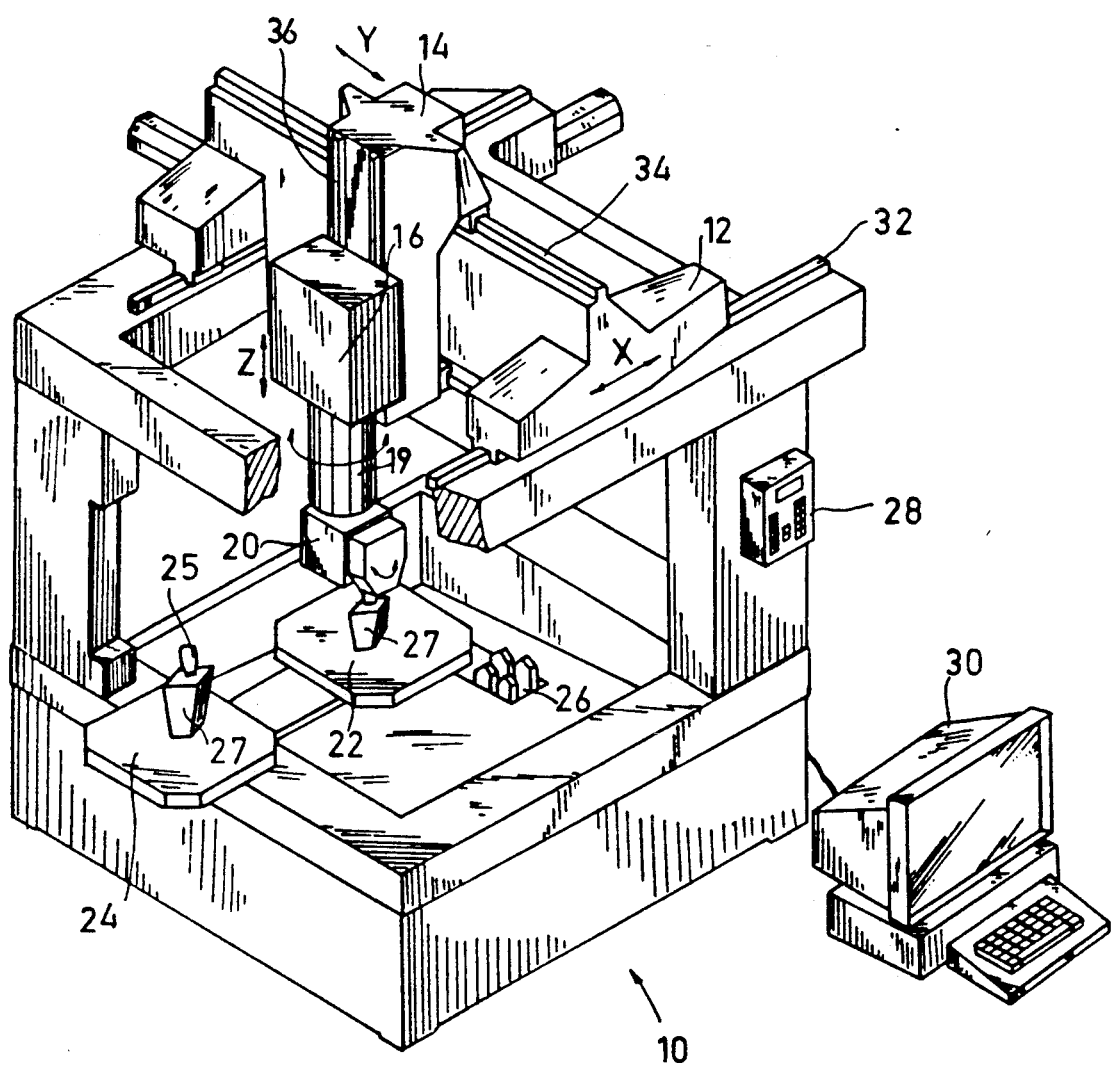
FIG. 1 is a pictorial illustration of a machine for automatic deburring constructed and operative according to a preferred embodiment of the invention.

Reference is made to FIG. 1, a pictorial illustration of a preferred embodiment of the finishing machine typically used for deburring. The machine comprises a frame 10, rigidly built to reduce vibrations, a five-dimensional motion system comprising three rigid carriages 12, 14 and 16 for three coordinate axis translational movement, similar to those found in the VRC by Mazak or the SNC 86 by Makino both of Japan, a fourth-axis rotating assembly 18 (FIG. 2C) for z-axis rotation, located interiorly of a housing 19, and a fifth-axis assembly 20 for y-axis rotation. The machine also includes two interchangeable pallets 22 and 24, similar to those found in the following machines: the HC 400 by Mazak, the MH40 by Mori Seiki, or the MC 40 by Makino all of Japan. Pallet 22 in FIG. 1 holds a current workpiece holder 27 in the active position and pallet 24 acts as a station for unloading previously deburred workpieces 25 and for loading the next workpieces 25 to be deburred. Additionally the machine includes an automatic tool changing magazine 26, Computerized Numerical Control (CNC) apparatus 28, such as the A02BC091B501 from Fanuc of Tokyo, Japan, and a workstation computer 30, such as the System 120 by Intel.

The system of FIG. 1 operates as follows. An operator enters a description of the workpiece 25 to deburred and parameters of the deburring process into the workstation computer 30. The workstation computer 30 calculate a three-dimensional path about the workpiece 25 along which a deburring tool should be drawn and downloads the path to the CNC apparatus 28. CNC apparatus 28 commands the five-dimensional motion system to move a deburring tool along the three-dimensional path, to rotate the deburring tool in order to remove the entirety of burrs on the workpiece 25, and to change deburring tools as necessary.

The five-dimensional motion is created as follows. The rigid carriages 12, 14 and 16 are moved along three guideways 32, 34 and 36, respectively, by AC servo motors, such as the A06B-0501-B031 by Fanuc, controlled by a closed loop digital servo system, such as the A06B-6057-H005 by Fanuc, which typically uses absolute encoders. Carriage 12 translates along the x-axis and carries the other two carriages 14 and 16, as well as the two rotating elements. Carriage 14 translates across carriage 12 in the y-axis. Carriage 16, carrying the rotating elements, translates in the z-axis along carriage 14.

A variable pitch duplex antibacklash worm gear, such as one by Flender of Bocholt, W. Germany, attached to the z-axis carriage 16 and preferably actuated by the servo motor of carriage 16 via a timing belt, is operative to rotate the fourth-axis assembly 18 (FIG. 2C), located interiorly of a typically nonrotating housing 19, about the z-axis.

Figure 2A:
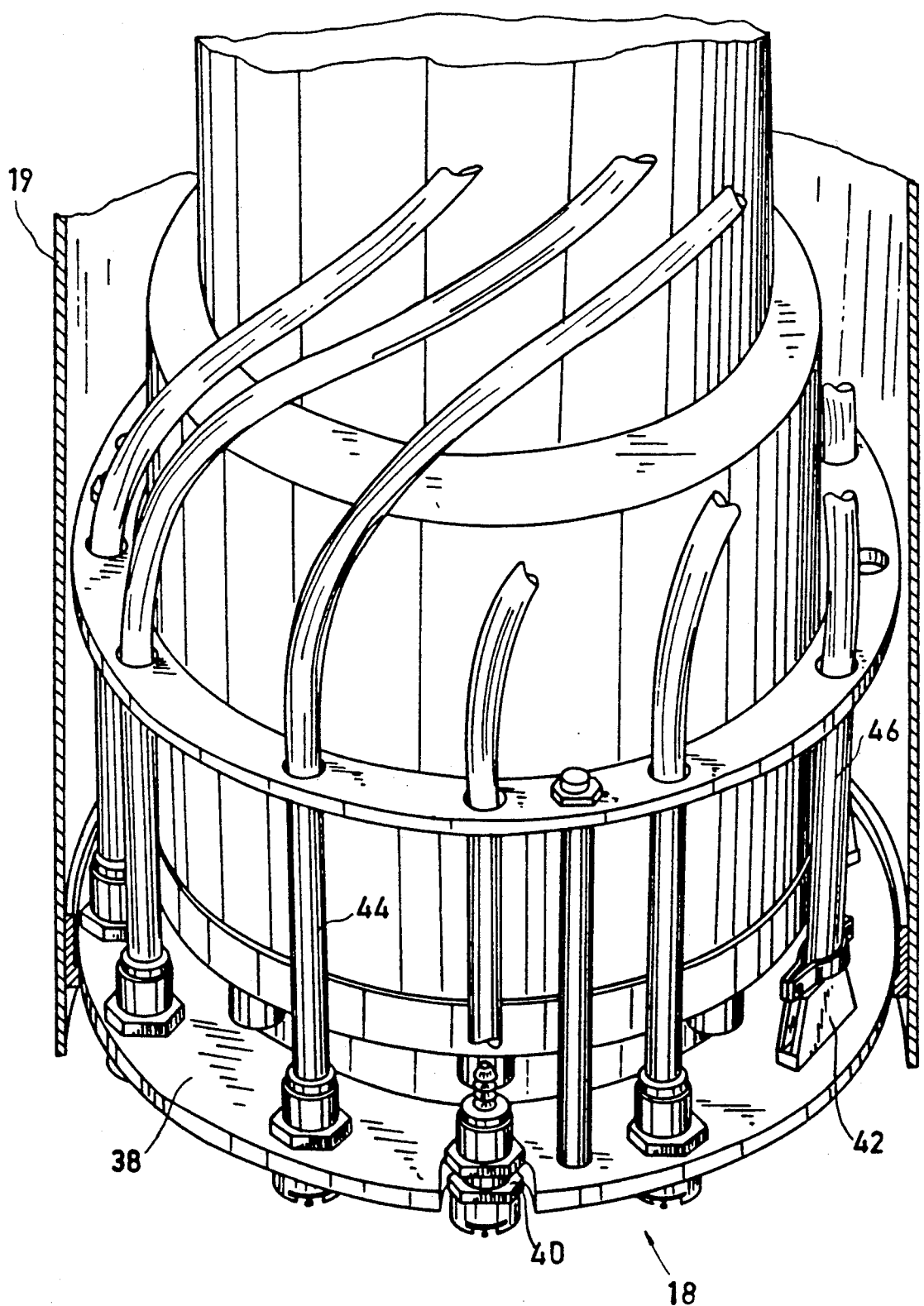
FIGS. 2A, 2B and 2C are pictorial illustrations of the fourth and fifth axes of the machine of FIG. 1.
Figure 2B:
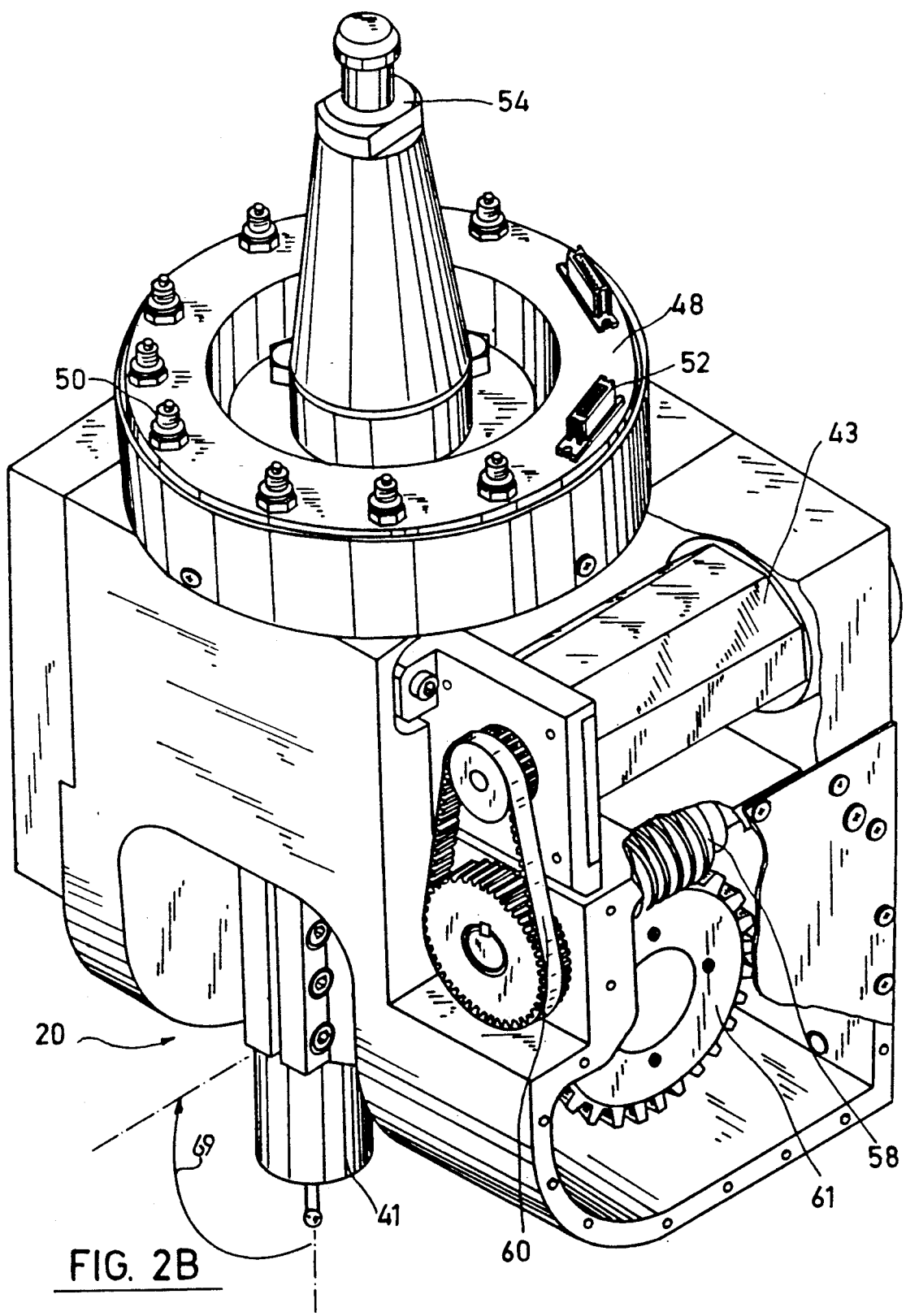
Figure 2C:
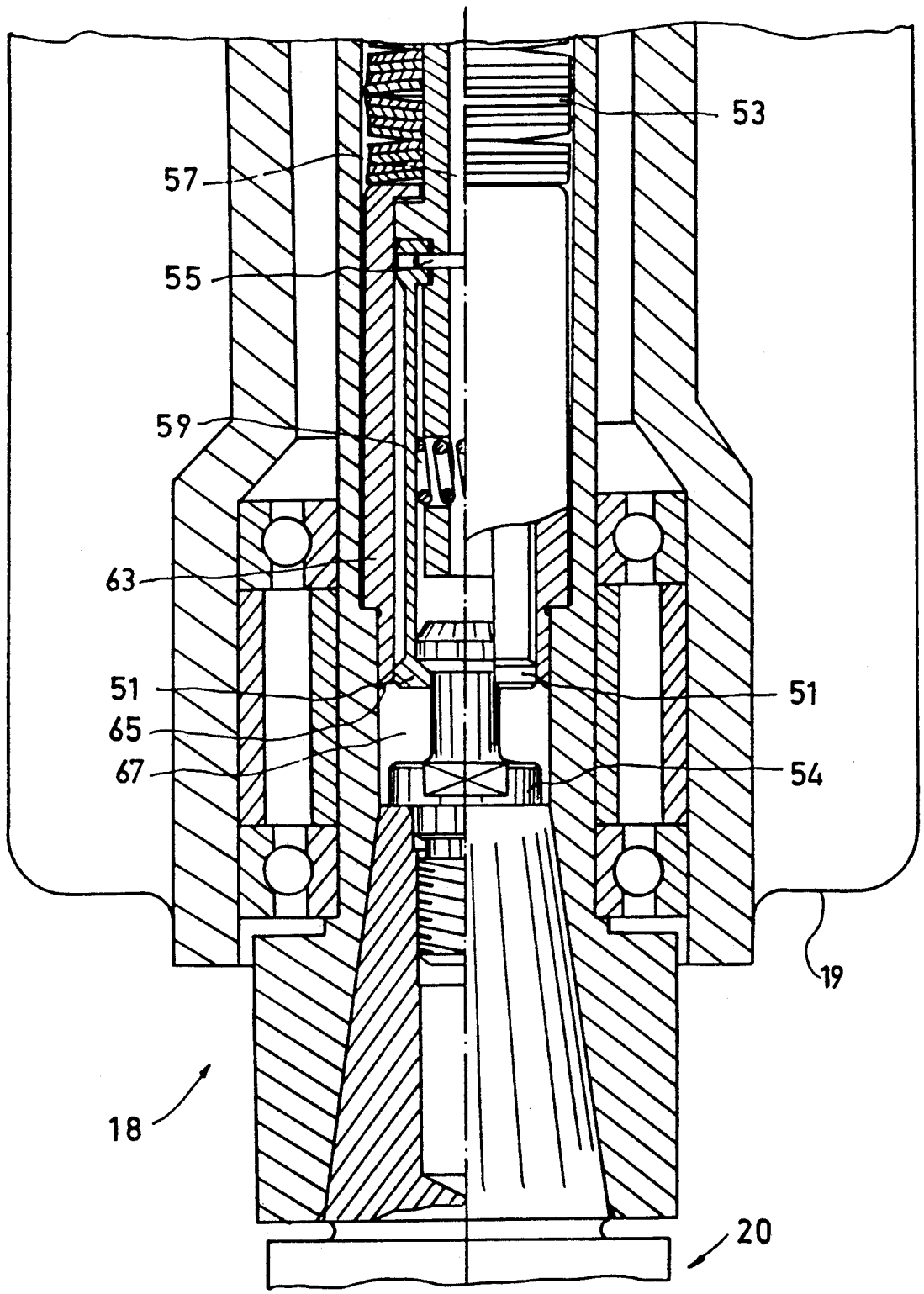

According to a preferred embodiment of the invention, and as shown in FIGS. 2A, 2B and 2C, the fifth-axis assembly 20 is a wholly enclosed motor and spindle system and is removable from the deburring machine in general and, specifically, from fourth-axis assembly 18. It will be appreciated that by incorporating a removable spindle system, a variety of spindles with varying speeds and torques, each useful for deburring a different type of metal, is availablle to the operator.

FIG. 2A illustrates an isometric view of the fourth-axis assembly 18 near the junction with the fifth-axis assembly 20. As shown in FIG. 2A, a metal ring 38 is disposed at the junction. Attached to the metal ring 38 are female halves of the following connectors: quick release liquid connectors 40, such as the MCD 16-02 by Colder Products Co. of St. Paul, Minnesota of the USA, and 20-pin quick-release electrical connectors 42. Attached to the liquid connectors 40 are flexible tubes 44, typically for supplying spindle cooling fluids, compressed air and lubricating oil mist to a motor of a high frequency motor spindele 41 (FIG. 2B), such as the GSU75 from Gamfior of Torino, Italy, located in the fifth-axis assembly 20. Attached to the electrical connectors 42 are wire bundles 46, typically for supplying electricity to the motor of spindle 41 and to the servo motor 43 (FIG. 2B) of fifth-axis assembly 20. The tubes 44 and wire bundles 46 are cut to a length to enable the fourth-axis assembly 18 to rotate a full 360°.

According to a preferred embodiment of the invention and as shown in FIG. 2B, a metal ring 48 on the fifth-axis assembly 20, corresponding to metal ring 38, holds the male halves 50 and 52 of the liquid and electrical connectors, respectively. The fifth-axis assembly 20 has a pull stud 54 for connecting the fifth-axis assembly 20 to the fourth-axis assembly 18. As shown in FIG. 2C, the fourth-axis assembly 18 is built with a taper to correspond to the taper of pull stud 54.

The fourth-axis clamping assembly operates as follows: conical disk springs 53 (FIG. 2C), such as the Belleville springs from Schnorr of Sindelifingen, W. Germany, are located along the length of a draw bar 57 and provide a positive upward force to draw bar 57 which serves to maintain it in a predetermined location.

The draw bar 57 is attached to a horizontal rod 55 to which are attached two clamps 51, typically placed at 180° to each other. A spiral spring 59 pushes the clamps 51 against housing side walls 63 of the fourth axis assembly 18 and maintains the clamps 51 in an open position. The space between the side walls 63 is typically designed to be slightly smaller than the width of the head of the pull stud 54 when surrounded by the clamps 51, as shown in FIG. 2C, thus ensuring that, when the head of the pull stud 54 is between the clamps 51, the side walls 63 push against the clamps 51 which subsequently push against the head of the pull stud 54 and securely hold the fifth axis assembly 20 to the fourth-axis assembly 18.

To remove the fifth-axis assembly 20, an hydraulic cylinder, not shown in FIG. 2C, pushes draw bar 57 with a force which overcomes the positive upward force of the conical springs 53. As draw bar 57 descends, clamps 51 descend with it. AS clamps 51 reach the tapered ends 65 of side wall 63, spring 59 pushes the clamps 51 to open into the wider space 67, enablind pull stud 54 to be removed.

Reference is now made back to FIG. 2B. The removable fifth-axis assembly 20 is typically a wholly enclosed motor system and is operative to rotate the motor spindle 41 through typically 90° from horizontal and facing the workpiece 25 to vertical and facing down, as indicated by arrow 69. The assembly 20 comprises the servo motor 43, a worm gear transmission comprising a worm screw 58 and a gear 61, typically similar to the worm gear transmission of the fourth-axis assembly 18, and a timing belt 60. Gear 61 is typically attached to the axle of the spindle 41. The servo motor 43 rotates the timing belt 60 which is operative to rotate worm screw 58 of the worm gear transmission. The rotation of worm screw 58 causes gear 61 to rotate, thus producing the rotary motion of the spindle 41 about the fifth axis. It is a feature of the present invention that the abovedescribed wholly enclosed motor system produces a gear ratio of 1:91 and an accuracy of 0.001°.

Figure 3A:
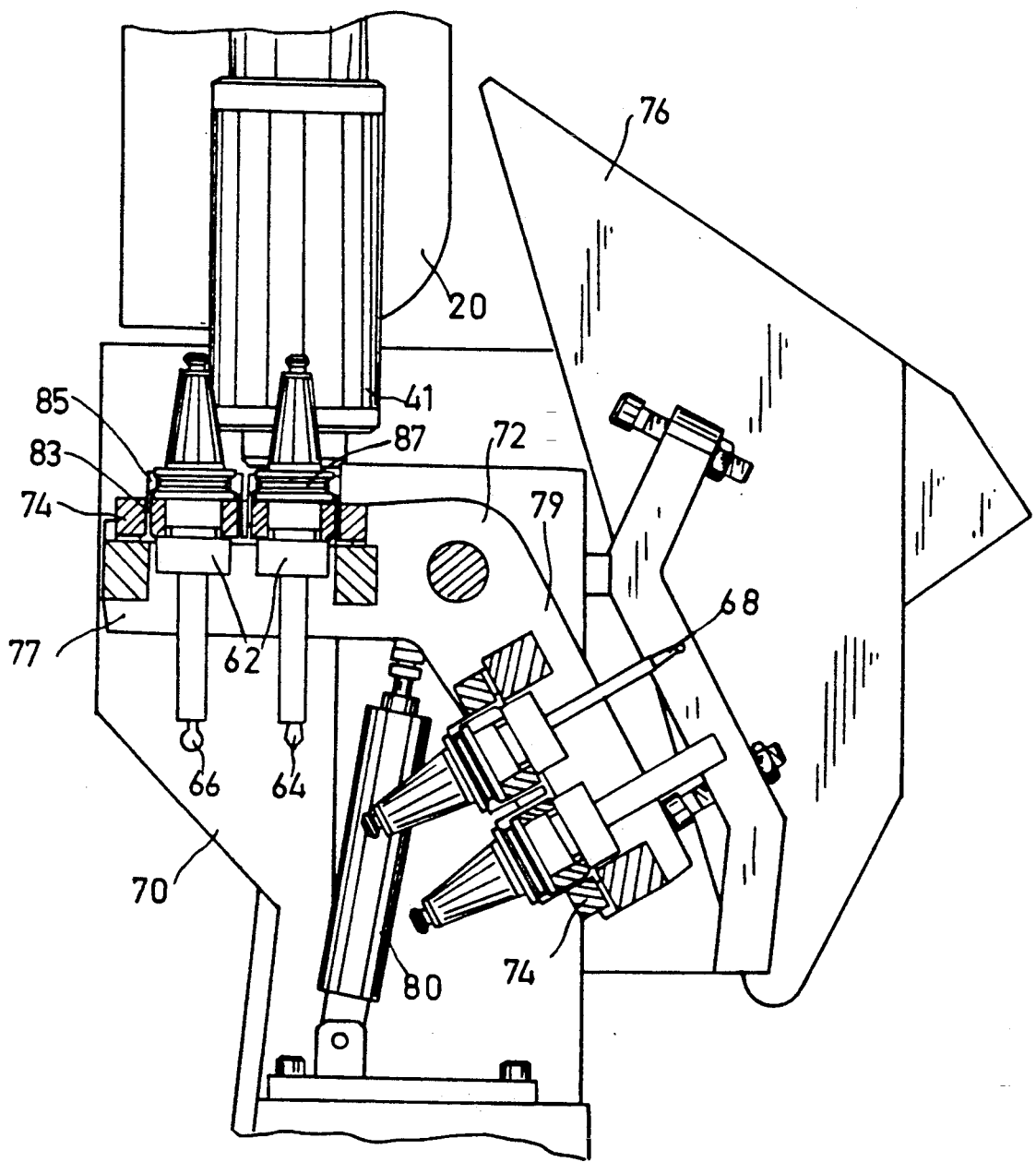
FIGS. 3A and 3B are pictorial illustrations of a tool changing mechanism useful for the machine of FIG. 1.
Figure 3B:
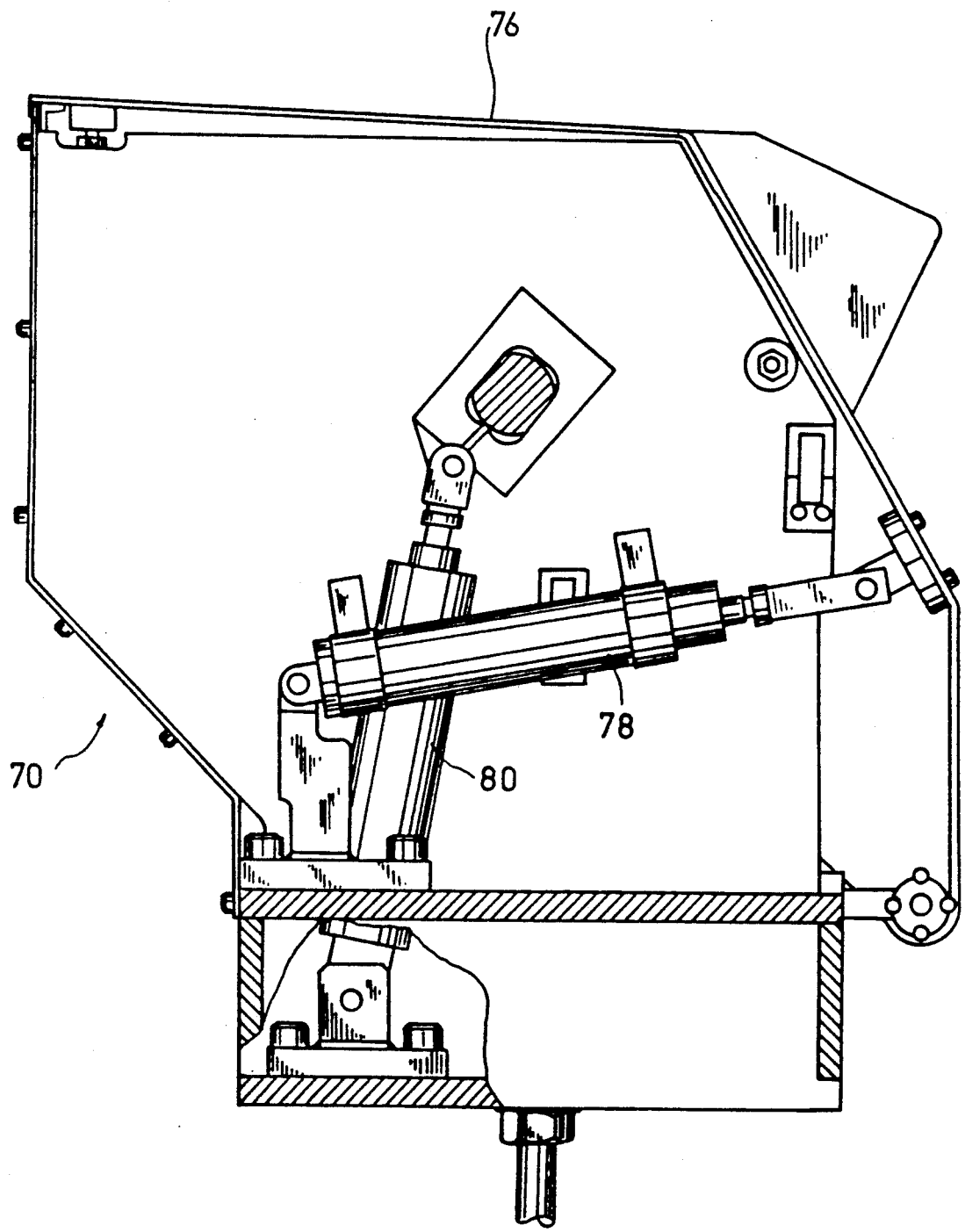
Figure 3C:
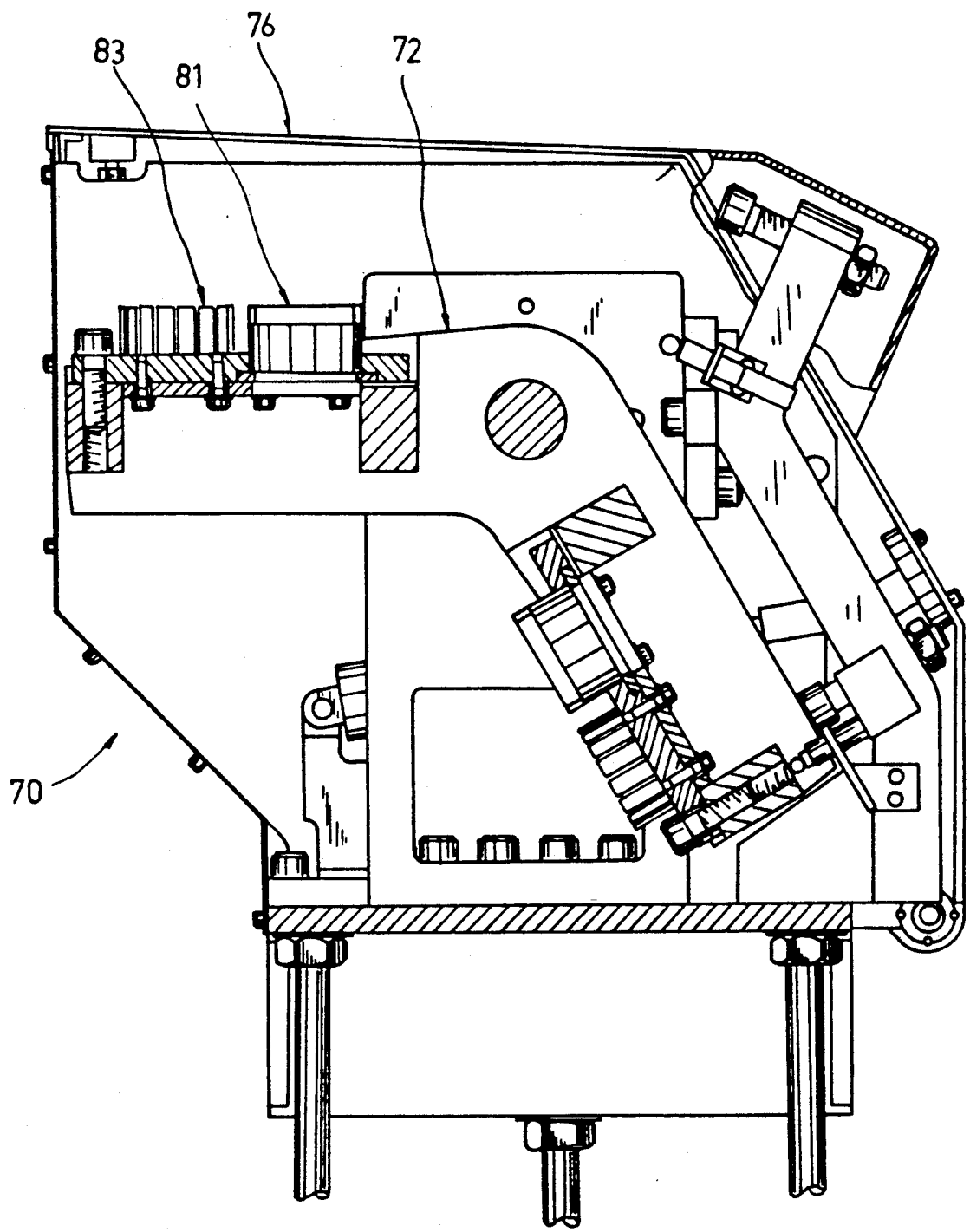
FIG. 3C is a pictorial illustration of a tool clamp useful in the tool changing mechanism of FIGS. 3A and 3B.

Reference is now made to FIGS. 3A, 3B and 3C. Similarly to the the fourth-axis assembly 18, the spindle 41 typically comprises a female taper connection, in order to connect to a tool mandrel 62 with a pull stud. FIG. 3A illustrates the spindle 41 and the tool mandrel 62 in the vertical down position. A tool 64, such as the TCD0303 from Biax of Maulbronn in W. Germany, a brush 66, such as the 15025 from Osborn of Cleveland, Ohio of the USA, or a promixty sensor probe 68, such as the LP2 from Renishaw of Gloucestershire, England, is permanently affixed to the end of the tool mandrel 62. A deburring machine will typically have a plurality of tools and at least one probe 68, each attached to a tool mandrel 62 and stored in a static tool magazine 70 which typically stores 40 tools. An alternative embodiment of the tool magazine holds 20 tools.

The tool magazine 70 typically comprises a tool stand 72 for holding two sets of tool mandrels 62 at 120° to each other, by means of two linear cluster holders 74 each holding a cluster of typically 20 tool mandrels 62 together, and a tool magazine cover 76 to protect the tools from metal dust and grit which typically accumulate during the operation of the deburring machine. The tool stand 72 typically comprises two tool beds 77 and 79 at 120° to each other and rotates about an axis along the line of intersection of the two tool beds 77 and 79. The two linear cluster holders 74 are placed in the tool beds 77 and 79 in a manner such that, upon rotation of the tool stand 72 in a clockwise direction, the tool mandrels 62 stand vertically with their pull studs ends facing up.

The tool magazine 70 typically operates as follows. Upon a command from the CNC apparatus 28, a pneumatic cylinder 78 (FIG. 3B), such as the AC 75D R M75 from Baccara of Kvutzat Geva of Israel, opens the cover 76 and a hydraulic cylinder 80 (FIG. 3B) positions the tool stand 72 such that a tool bed 77 or 79 with an empty pocket in the respective tool holder 74 is placed in a horizontal position.

Subsequently, the CNC apparatus 28 positions the motor spindle 41, with a tool mandrel 62 inside, vertically over the empty pocket. The motor spindle 41 is then lowered, also under direction of the CNC apparatus 28, until the tool mandrel 62 clips into the pocket under the action of a retaining spring 81, such as a cylinder evenly longitudinally sliced to produce about 40 long thin springs 83 shown in FIG. 3A and in FIG. 3C. As shown in FIG. 3A, at the end of each long spring 83 is an extension 85 which clips into a matching groove 87 of tool mandrel 62 as tool mandrel 62 is lowered into retaining spring 81. The CNC apparatus 28 then activates a tool release mechanism of the motor spindle 41, typically a standard function of the motor spindle 41, and the tool mandrel 62 is released into the empty pocket.

Upon successful release of the tool mandrel 62, the CNC apparatus 28 raises the motor spindle 41, positions it at the location of the desired next tool, and lowers the spindle 41 towards the next tool mandrel 62. The CNC apparatus 28 activates a clamping mechanism of the motor spindle 41, typically a standard function of the motor spindle 41, and the next tool mandrel 62 is attached to the spindle 41. The CNC apparatus 28 then raises the spindle 41, with the attached tool mandrel 62, above the tool magazine 70 and the tool magazine cover 76 is closed.

Figure 4A:
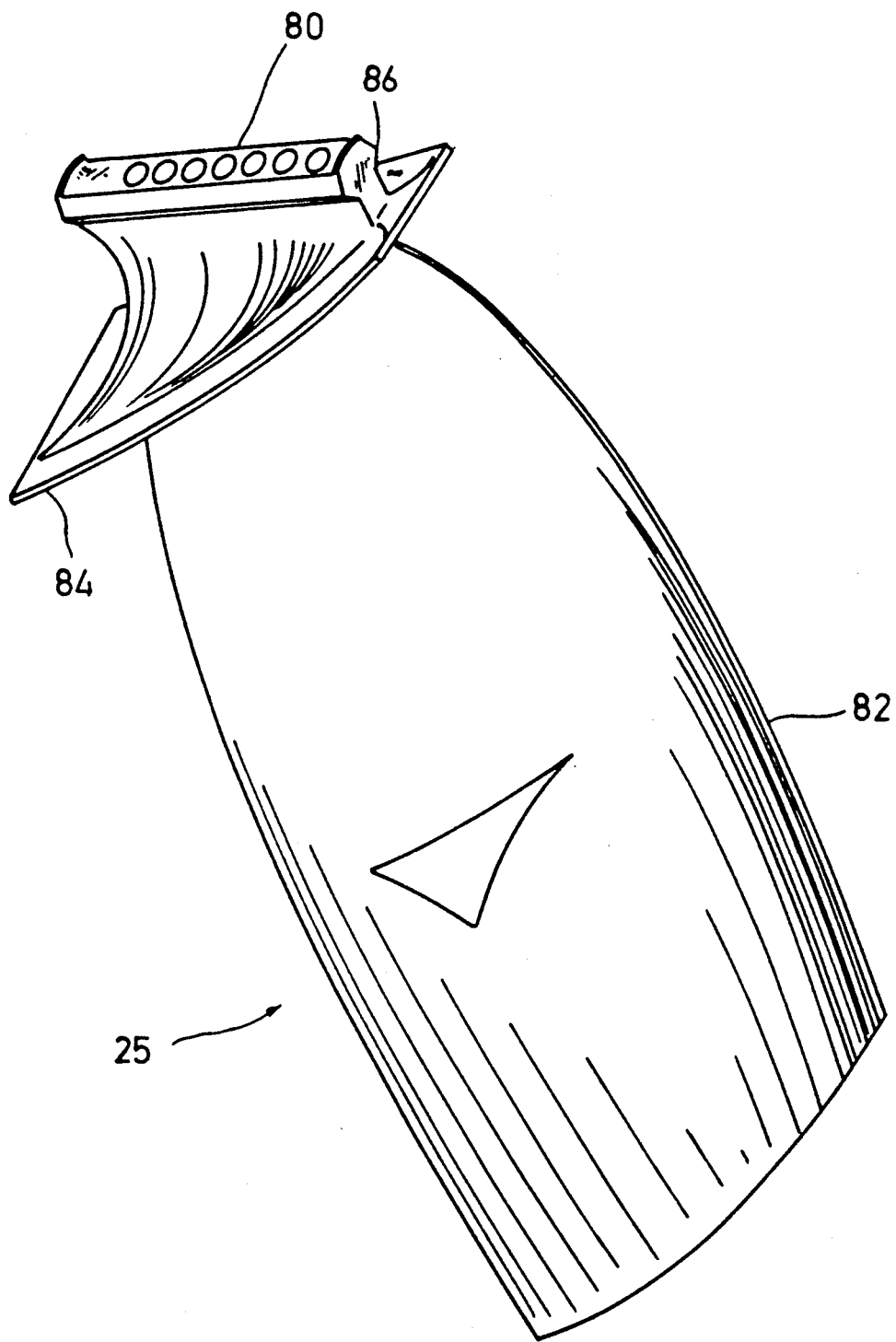
FIG. 4A is a pictorial illustration of a workpiece to be deburred by the machine of FIG. 1.
Figure 4B:
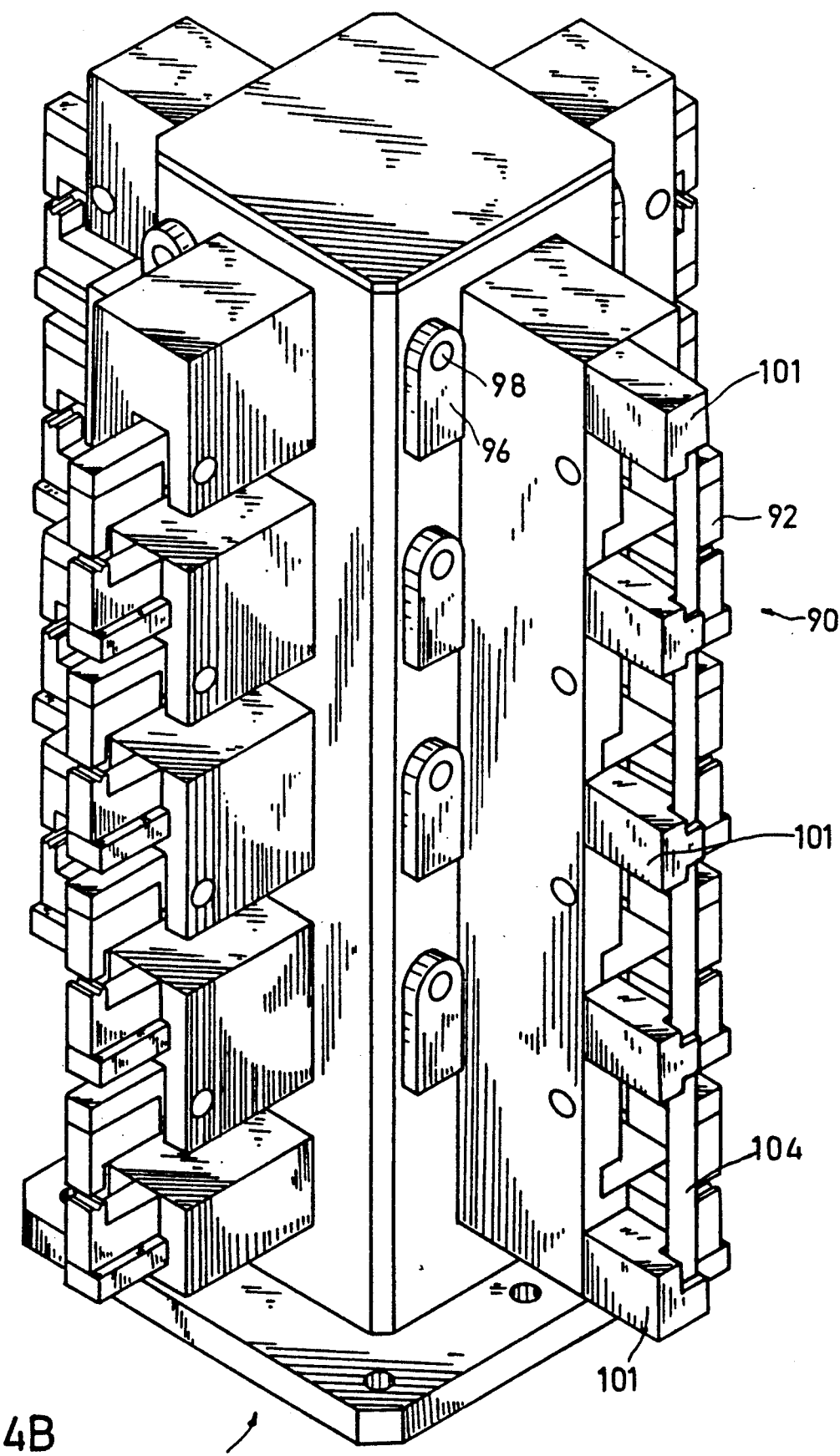
FIG. 4B is a pictorial illustration of a workpiece holder useful for the machine of FIG. 1.
Figure 4C:
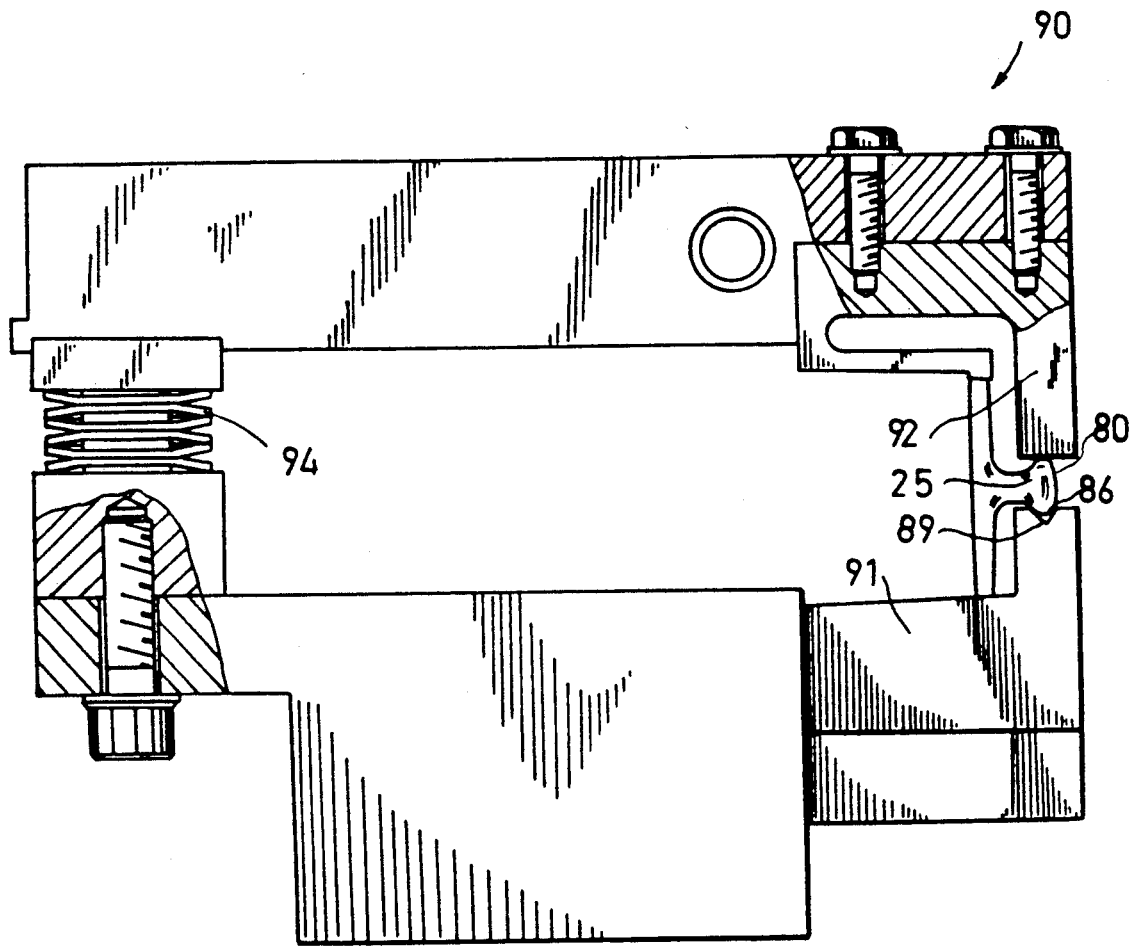
FIG. 4C is a cross-section illustration of a clamping system useful in the workpiece holder of FIG. 4B.

Reference is now made to FIGS. 4A, 4B and 4C which show an example workpiece 25 to be deburred, an isometric illustration of a typical workpiece holder 27 and a cross-section of a workpiece clamp 90, respectively.

The example workpiece 25 comprises a blade to be deburred which typically comprises a root 80, an airfoil 82 and a platform 84. For this example, only the root 80 requires deburring.

The workpiece holder 27 typically holds 16 workpieces 25, four on each of four sides of the holder 27, by clamping onto a triangular portion 86 of the root 80 with a clamp 90. It should be noted that the airfoil 82 is placed inside the clamp 90 such that only the root 80 faces to the outside of the clamp 90. Thus, only the root 80 will be deburred.

For each workpiece 25, the triangular portion 86 fits into a stationary L-shaped lower clamp half 91 which typically is shaped with a triangular groove 89 (FIG. 4C) of the size of the triangular portion 86 of workpiece 25. A movable L-shaped upper clamp half 92 has no such indentation. At the end of the long side of upper clamp half 92 stands a series of Belleville springs 94, which, at resting position, push the clamp closed. An eccentrically placed handle 96, attached to an axle 98 placed opposite the springs 94, is operative to open the clamp.

To ensure proper placement of each workpiece 25 in the horizontal direction, two blocks 101 are attached to the corresponding workpiece holder 27 and a pin 104 is removably placed therebetween as illustrated. It is noted that a single block 101 is typically attached to the two adjacent workpiece holders on both sides of the block 101, so that, to ensure proper placement of the four workpieces 25 on each side of the holder 27, five blocks 101 are required. In FIG. 4B, these details can be best appreciated by considering the illustration of the blocks and pins at the front right hand side of the holder 27.

The operator places pin 104 between the two blocks 101 during setup of the workpiece holder 27. The operator then places the workpiece 25 into the clamp 90 and ensures that the workpiece 25 touches pin 104, at which point the workpiece 25 is properly aligned. The operator pushes handle 96 up to clamp the workpiece 25 into clamp 90 and, finally, removes pin 104. The operation described hereinabove is repeated for each workpiece 25 to be placed into workpiece holder 27.

The operation of the deburring machine of the present invention is under software control, both for setting up the parameters of particular deburring task and for building the CNC program by which the CNC apparatus 28 performs the particular deburring task.

Figure 5A:
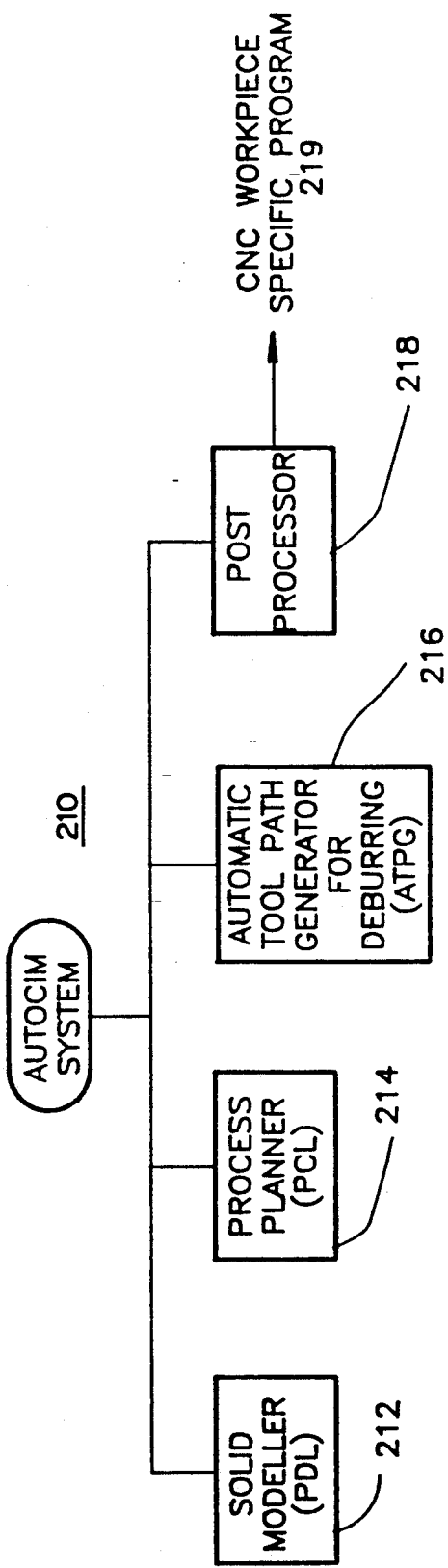
FIGS. 5A and 5B are block diagram illustrations of the system software, comprising the workstation software, knows as AUTOCIM and illustrated in FIG. 5A, and the Computerized Numerical Control System software, illustrated in FIG. 5B.

The software of the preferred embodiment comprises two systems, one which operates the workstation 30 and one which operates the CNC apparatus 28. FIG. 5A illustrates the workstation software 210 which comprises four elements, a solid modeller, PDL 212, a process planner, PCL 214; an automatic tool path generator for deburring, ATPG 216; and a post processor 218. The PDL 212 typically accepts an input from the user, typically via a mouse and a keyboard, describing the workpiece to be deburred. The PCL 214 typically accepts an input, typically via a mouse and a keyboard, from the user defining the conditions and requirements of the machining process and combines the user input with the previously defined workpiece description.

Figure 5B:
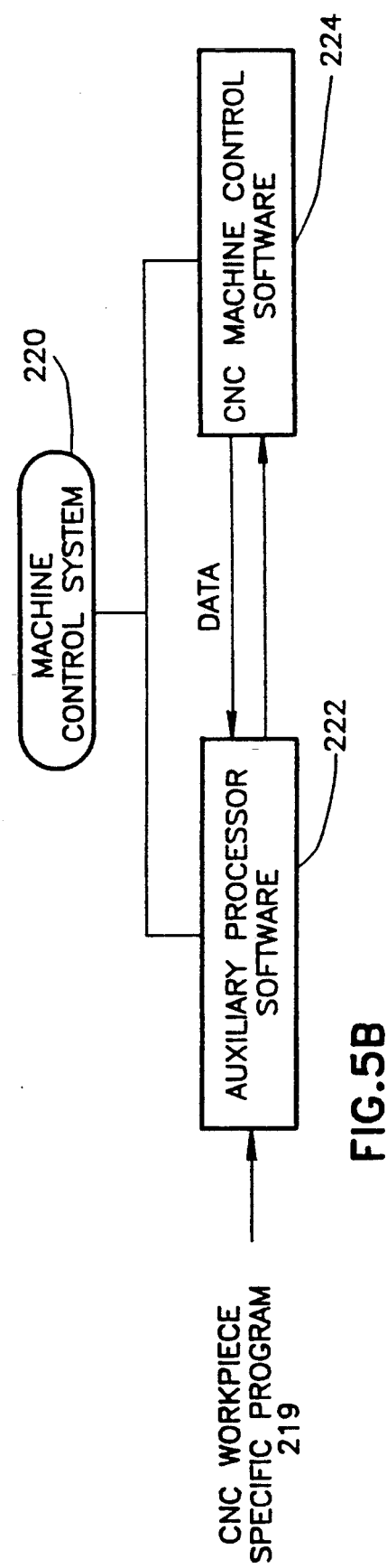

The ATPG 216 calculates from the workpiece description and the machine process description an optimized tool path, typically including tool changes, for completely deburring the workpiece. The post processor 218 converts the optimized tool path, produced by the ATPG 216, into a CNC workpiece specific program 219, comprising motion commands to a target coordinate position as well as the target coordinate position, which typically is downloaded to an auxilary processor software system 222 typically forming part of a CNC control software system 220, diagrammed in FIG. 5B.

The CNC control software 220 comprises two elements, auxiliary processor software 222 running on an auxiliary processor of the CNC apparatus 28 and CNC machine control software 224 supplied with the CNC apparatus 28. The auxiliary processor software 222 accepts the CNC workpiece specific program 219 from the post processor 218 and, if desired by the user, actuates a process to probe the placement of the workpiece and to calculate a correction matrix for correcting the tool paths should the workpiece prove to be inaccurately placed. The CNC machine control software 224, in tandem with the CNC apparatus 28, moves the tool to the desired positions according to the tool paths contained in the CNC workpiece specific program 219, possibly mofified, in real time, via the auxiliary processor software 222. The auxiliary processor software 222 typically utilizes the previously calculated correction matrix for the corrections.

The PDL 212 typically presents to the user a method for defining the geometry of the workpiece. The preferred embodiment uses constructive solid geometry (CSG); however, boundary representations are also possible. Constructive solid geometry represents a workpiece ass a combination of solid primitives, such as rectangular blocks, cylinders, cones, spheres, etc., combined together by boolean operations, such as union, intersection, and substration. The information about the relative position in space of the primitives with respect to each other is also part of the representation. The solid modeller preferably has graphic display abilities as well as editing abilities, such as the ability to change the position in space of a primitive or a sub-solid (solid formed by the boolean operation between two or more primitives, but not the final workpiece), adding, deleting or replacing sub-solids, and changing the boolean operation between two sub-solids.

According to the preferred embodiment of the invention, the user defines the requirements of the machining process in the PCL 214. These requirements typically include overall machining accuracy, the type of chamfer, such as straight or rounded, for each edge, the requested width of each straight chamfer at the starting point and ending point of the chamfer, thus enabling either a constant width chamfer or a gradually varying width chamfer, the requested radii of a rounded chamfer at the starting point and ending point of the chamfer, thus enabling a constant radius rounded chamber or a gradually varying radius rounded chamber, choice of external edges which the system need not deburr, and cancellation of a face or direction of approach. A user will cancel a face if it is obvious that no burr could be approached from that face, thus speeding up the calculations. Additionally, the PCL 214 requests a solid (PDL) description of the workpiece and of any clamping devices used, the theoretical location of the clamping device relative to the pallet, a selection of tools a subset of which the software will choose as appropriate for the requested machining, the type of material of the workpiece, and a selection of reference surfaces and approach directions for probing and measuring the accuracy of the workpiece placement, described hereinbelow.

Workpiece misplacement is typically caused by an inaccurate clamping device or by a clamping system with poor repeatability, where a clamping device typically holds at one time a set of one or more of workpieces. An inaccurate clamping device will repeatably identically position a plurality of sets of workpieces; however, none of the workpieces will be positioned according to the theoretical position described by the user in the PCL 214. To remain accurate in situations of inaccurate placement, probing of only the first set of workpieces is necessary. A clamping system with poor repeatability, on the other hand, requires probing of each set of workpieces. The method to compensate for the misplacement of the workpiece, typically included in the PCL 214, is described hereinbelow.

Figure 6:
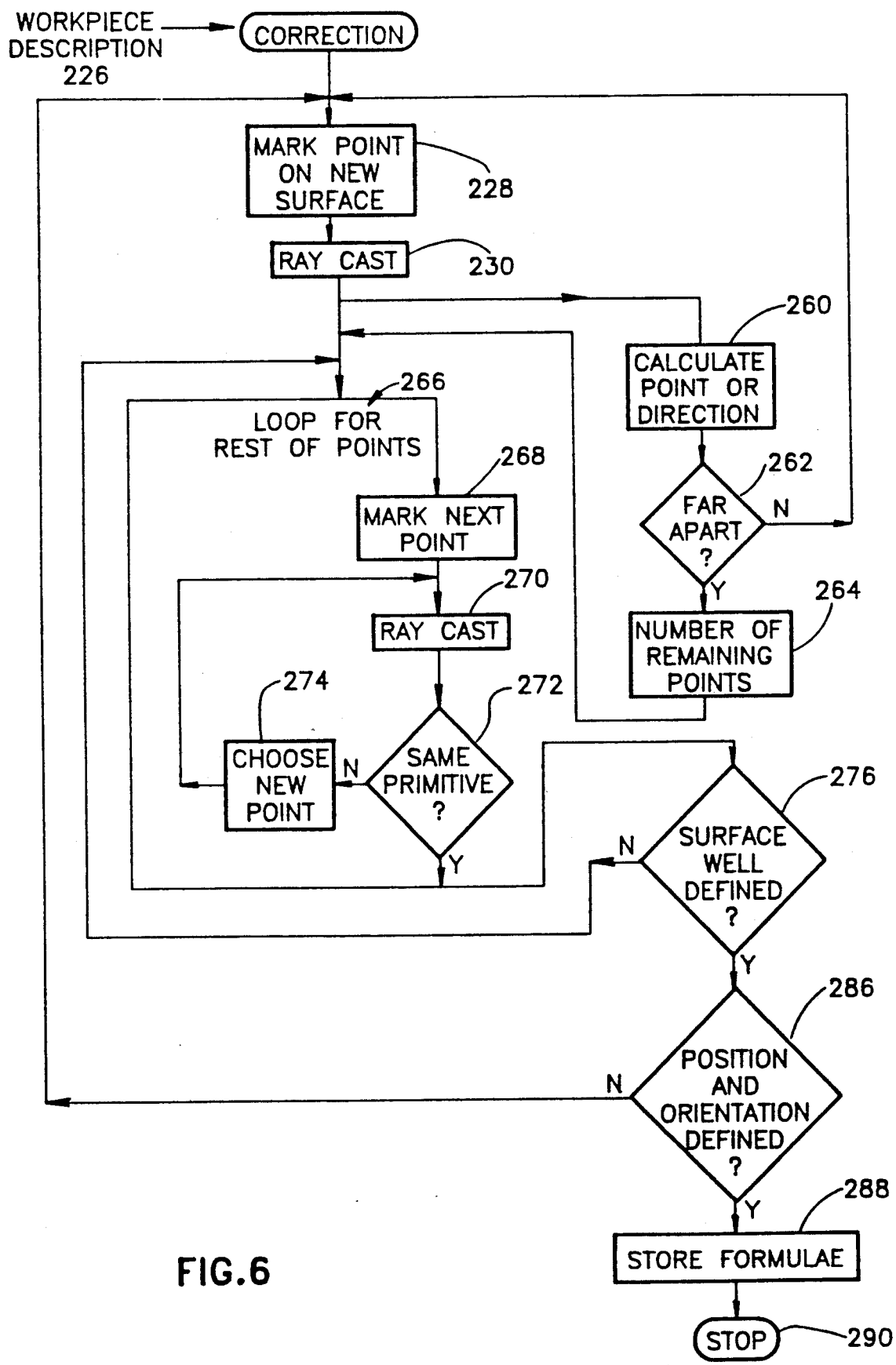
FIG. 6 is a flowchart illustration of a method for interactively accepting probing data from a user, useful for calculating the position and orientation of a workpiece useful in compensating for workpiece misalighment.

Reference is now made to FIG. 6 which outlines a preferred method for calculating the position and orientation of a workpiece useful in misplacement compensation. The method produces a position and orientation for the ideally placed workpiece, as well as formulae for calculating the position and orientation of a misplaced workpiece. The standard geometrical calculations described hereinbelow are found in *Computational Geometry For Design and Manufacture* by I. D. Faux and M. J. Pratt, published by Ellis Horwood Limited of Chichester, which is incorporated herein by reference.

The method accepts a solid geometric description 226 of the workpiece, preferably from the PDL 212 and preferably using constructive solid geometry, although other geometrical representations are possible. The user, in step 228 and through the use of a mouse and the graphical editor, marks a point on a surface of the workpiece. The point is defined as a probing point, the surface is defined as a reference surface and the direction of view of the user is defined as the inclination and approach direction for the probe.

In step 230, a ray casting is performed to find the primitive to which the surface of the workpiece just marked belongs, the type of surface, such as planar, spherical cylindrical, etc., of the primitive which contains the point, and the coordinates of the point on that surface. Ray casting is a standard technique in constructive solid geometry, described by Wyvill and Kunii in "A functional model for constructive solid geometry," *The Visual Computer*, 1985.

A preferred embodiment of ray casting casts a ray in the cartesian y direction entering the solid at the probing point and exiting the solid at some other point. A reference surface is defined to be a surface of the solid in the direction of view of the solid on the screen. If the view on the screen has been rotated to show the user other surfaces of the solid, the CSG description of the solid undergoes the identical rotation. Thus, the casted ray always enters the solid on the reference surface.

Figure 7:
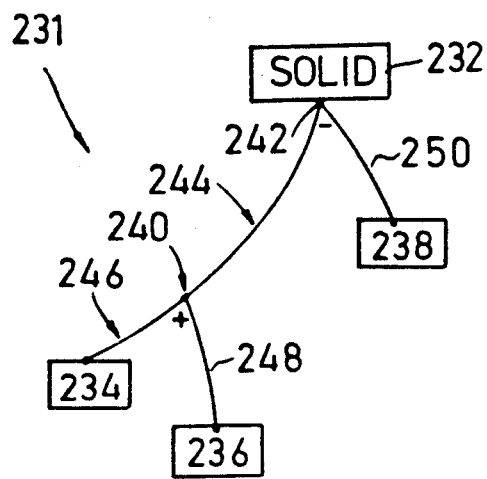
FIG. 7 is a simplified diagram of a constructive solid geometry tree useful for the method of FIG. 6.

The ray casting method uses a CSG boolean operation tree 231, as shown in simplified form in FIG. 7, to identify the surface through which the ray entered the solid. The CSG tree 231 is a structure whose root 232 is the solid description of the workpiece and whose leaves 234, 236 and 238 are descriptions of the primitives which include the type of primitive, its parameters and the transformation matrix needed to translate and rotate it to its final position in space. The nodes 240 and 242 are the boolean operators needed to form the solid.

The ray casting operates as follows. Beginning at the root 232, the tree is traversed down and to the left, up and to the right (i.e. while heading down the tree toward the leaves 234, 236, and 238, at every node 240 or 242 choose the left branch 244 or 246 until reaching a leaf. While heading back up from a leaf towards the root 232, at every node 240 or 242 choose the right branch 248 or 250 and head down it, or, if it has already been traversed, continue heading up). Upon reaching a leaf (i.e. a primitive), the type of primitive, the surface of the primitive which is penetrated and the surface which is exited, and the coordinates of the penetration and exit points are evaluated and the result is stored on a stack 251 (not shown). If the result is negative, an empty set is stored; otherwise, the pertinent data are stored. Upon returning to the previous node, if the return is from a left branch then the right branch of that node is traversed until reaching a leaf 234, 236, or 238. Otherwise, the operation at that node is evaluated between the two previous evaluations which are retrieved from the stack 251 and the resulting surfaces penetrated and exited (there can be more than one exit and entrance point), the coordinates of penetration and of exit, and the first entered primitive and its surface are stored on the stack 251.

After traversing the entire CSG tree 231, the type of primitive first entered and its parameters, the type of surface of the primitive and the coordinates of penetration are known. If the CSG description of the solid was rotated, a reverse rotation is performed and the world coordinates of the point, being the coordinates of the point with respect to the deburring machine, are calculated.

Reference is not made once again to FIG. 6, step 260. After the ray casting is performed, a physical point or a physical direction associated with the penetration surface is defined. For example, a cylinder has an axis of symmetry associated with it, a sphere has its center point, and a plane has its normal. This information is included in the parameters of all primitives and thus, is available from the results of the ray casting.

At step 262 the method checks that the surface just defined is at a significantly large enough angle or distance from the previously defined surface, if one exists, where 'significantly' typically means 30° between the physical directions defined in step 260. This restriction is imposed due to limitations in the numerical accuracy of current probes and computers. The angle between any two surfaces is defined according to the type of surfaces involved. For example, between two cylinders, the angle is defined as the angle between the two axes of symmetry, whereas between two planes the angle is defined as the angle between their two normals. Between two spheres there is no angle; in this case the centers of the two spheres have to be far apart relative to the overall size of the workpiece. However, between three spheres there is an angle. It is defined by the directions from the center of one sphere to each of the centers of the other two spheres.

If the surfaces are not significantly far apart by angle then the method returns to step 228 and requests that the user chosse a different surface. If the surfaces are significantly far apart, or if no surface has previously been defined, the method continues to step 264, described hereinbelow.

In step 264, the number of additional probing points needed to fully define the surface is retrieved from a look-up table. The number of points needed to define a surface depend on the type of surface and are as follows: three for a planar surface, provided that the points are not collinear, four for a spherical surface, provided that they are not all coplanar, and six for a cylinder, provided that five of them are coplanar and the sixth is not.

In step 266, a loop over the additional probing points is entered.

In step 268, the user is requested to mark another point on the same surface as before. If the surface is cylindrical, the system helps the user by drawing a vertical or horizontal line through the first point, choosing the direction which is more perpendicular to the axis of the cylinder. Each of the succeeding four points marked by the user should be on the drawn line. For any points which are not on the drawn line, the system calculates the intersection point of a line perpendicular to the drawn line, through the point which is not on the drawn line, and accepts the intersection point as the next point. For a non-cylindrical surface, the system gives no help.

In step 270, a ray casting, as described hereinabove, is performed. The primitive first entered is identified and the type of surface of the primitive and the coordinates of penetration are calculated.

A consistency check, in step 272, is performed. If the new point is on the same surface of the same primitive as before and far enough away from all previous points on the same surface, then the method returns to loop 266 and continues until no more additional points are needed. If the result of the consistency check is negative, then the user is requested, in step 274, to choose a point on the proper surface. The method then returns to step 270.

Once all the probing points for a surface have been entered, a check is performed, in step 276, to ensure that the surface is well defined. For a well defined surface, the probing points are significantly far apart relative to the overall size of the workpiece. If the surface is not well defined, the method returns to step 266 and requests that, to ensure a well defined surface, the user choose additional points or another surface if the area of the chosen surface is too small. If the opposite is true, the method proceeds to step 286, described hereinbelow.

Figure 8:
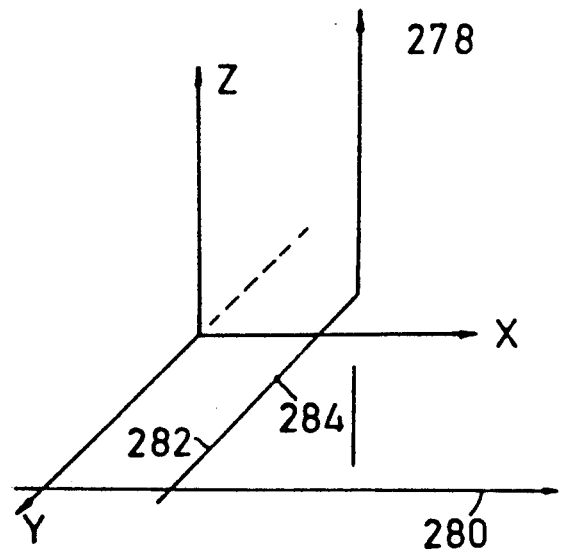
FIG. 8 illustrates two non-intersecting directional arrows and the physical point between them useful for the method of FIG. 6.

The position and orientation of a solid in space are completely defined by a coordinate point and two vector directions. As discussed hereinabove, each type of primitive has associated with it a physical point or a direction. For example, a sphere has a center point and a cylinder has the direction of the axis of symmetry. Depending on the types of surfaces available, either two or three surfaces will be required to define the coordinate point and two directions. For example, three planes are necessary to so define a position and orientation and, if their normals are not coplanar, they are sufficient since two such planes define a line of intersection which intersects the third such plane at a point. The vector directions of the normals of the first two planes are the directions required and the intersection point is the required point. By convention, the normal to a surface is directed outwardly, i.e. from the workpiece towards the air. The situation for two non-parallel cylinders is shown in FIG. 8. The directed axes of symmetry 278 and 280 define the two directions; however, if they are skewed to each other and thus, do not intersect in space, the shortest line segment 282 between the two axes is found and its center point 284 becomes the required coordinate point. Otherwise, if they are coplanar but not parallel, their intersection point becomes the required point.

In step 286, the method checks whether or not the requisite point and two directions have been defined, as discussed hereinabove. If the response is negative, the method requires another surface and thus, returns to step 228 to define an additional surface. If the response is affirmative, the method continues to step 288, described hereinbelow.

For each legal combination of surfaces, one set of parametrized formulae for calculating the coordinate point and two vector directions are previously defined in the software of the system. The formulae are defined using geometrical relationships described in *Computational Geometry for Design and Manufacture*, mentioned hereinabove, and are stored in a lookup table. The parameters depend on the size, shape and location of the chosen surfaces.

A non-legal combination of surfaces might be two spheres, two parallel cylinders or three planes whose normals are coplanar.

In step 288 the method chooses the appropriate formulae to calculate the coordinate point and two vector directions from the surfaces defined by the chosen probing points. The formulae for the chosen probing points are stored in a specific file, to be transferred via the post processor 218 to the auxiliary processor software 222 at a later time.

In step 290 the method ends, having produced the specific formulae necessary to calculate the coordinate point and two directions for the workpiece from probing points. An ideal point and two directions (i.e. the point and directions defined for the ideally placed workpiece) have also been produced directly from the CSG tree 231.

The formulae, ideal coordinate point and two directions, the coordinates of the probing points, and the directions of approach for the probing are typically passed to the ATPG 216 and from there, to the post processor 218. From the coordinates of the probing points and the directions of approach, the post processor 218 typically creates a portion of CNC workpiece specific program 219 which comprises a program to bring the probe 68 along the desired approach directions toward the probing points. The remainder of CNC program 219 comprises the optimized tool path coordinate points generated by the ATPG 216, discussed hereinbelow. The entire CNC program 219 is subsequently downloaded to the auxiliary processor software 222.

The auxiliary processor software 222 will execute the probing, process the resultant measured points according to the formulae received from the post processor 218 and produce the measured coordinate point and two vectors. From the measured and ideal coordinate points and vectors, the software 222 produces a set of transformations necessary to transform the ideal position and orientation into the measured ones. The software 222 uses the transformations to create a correction matrix to be applied to all of the ideal tool path coordinate points produced by the ATPG 216, thus producing a software correction to the inaccuracy in the workpiece placement.

The correction matrix is produced as follows. At the request of the user, the probing is initiated. The probe is moved along the desired direction of approach towards the position of the first previously defined probing point, stopping immediately upon touching the workpiece. The coordinates of the probe at the moment of touch are recorded by the auxiliary processor software 222 and the probe is moved to the next probing point.

Upon completion of the probing, the auxiliary software 222 processes the probing data, utilizing the formulae downloaded to it to calculate the coordinate point and direction vectors of the inaccurately placed workpiece, called the measured coordinate point and direction vectors.

Figure 9A:
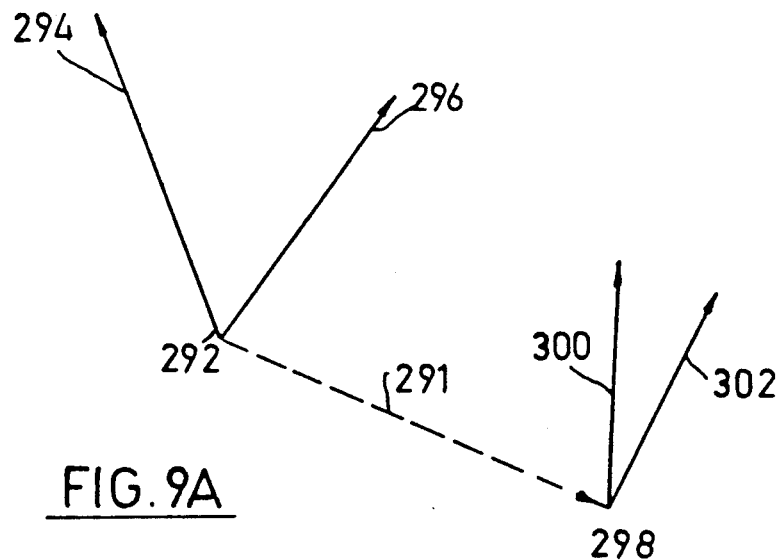
FIGS. 9A, 9B and 9C geometrically illustrates the method of calculating a correction matrix to account for the inaccurate placement of a workpiece.

Reference is not made to FIG. 9 which indicates geometrically, the set of transformations needed to calculate the correction matrix. FIG. 9A shows a transformation 291, from the ideal position and orientation, defined by a ideal point 292, and ideal directions 294 and 296, to a measured point 298 and measured directions 300 and 302. Transformation 291 is a translation transformation that brings point 292 in contact with point 298.

Figure 9B:
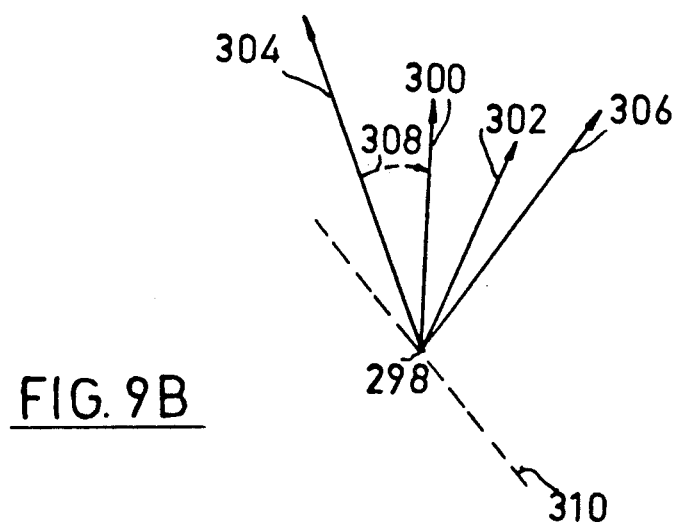

FIG. 9B shows the result of transformation 291. Points 292 and 298 now coincide, denoted by 298, and vectors 294 and 296 have been transformed into vectors 304 and 306, respectively. Vectors 300 and 302 have remained unchanged. The second transformation, denoted 308 in the figure, rotates vector 304 into vector 300 about axis 310, an axis perpendicular to both vectors 300 and 304 at point 298. Axis 310 is calculated by taking the cross product of vectors 300 and 304.

Figure 9C:
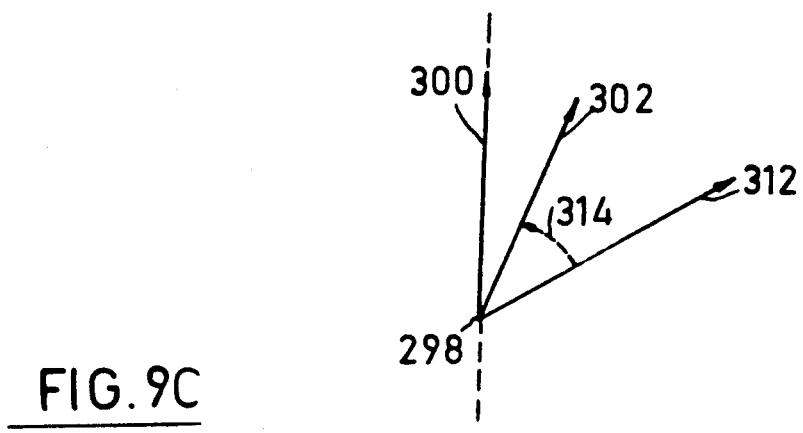

FIG. 9C shows the result of transformation 308. In addition to the coincidence of points 292 and 298, vectors 304 and 300 now also coincide. Vector 306 has been transformed into vector 312. The final transformation, denoted 314 in FIG. 9C, rotates vector 312 into vector 302, about the axis defined by vector 300. This transformation 314 assumes that the angle subtended by the vectors 300 and 302, calculated from the coordinates of the probed points in accordance with the downloaded formulae, is equal to the angle subtended by the ideal vectors 294 and 296. Due to inherent small inaccuracies of the probing process and to small errors introduced by the computation process, the abovementioned assumptions will be only approximately true. It will be appreciated that it is sufficient to ensure that vector 312 be rotated about vector 300 until vector 312 lies in the plane subtended by vector 312 and 302.

The three transformations, 291, 308 and 314, can be represented as three 4×4 matrix transformations, which, when combined together by matrix multiplication, produce the correction matrix.

Figure 10:
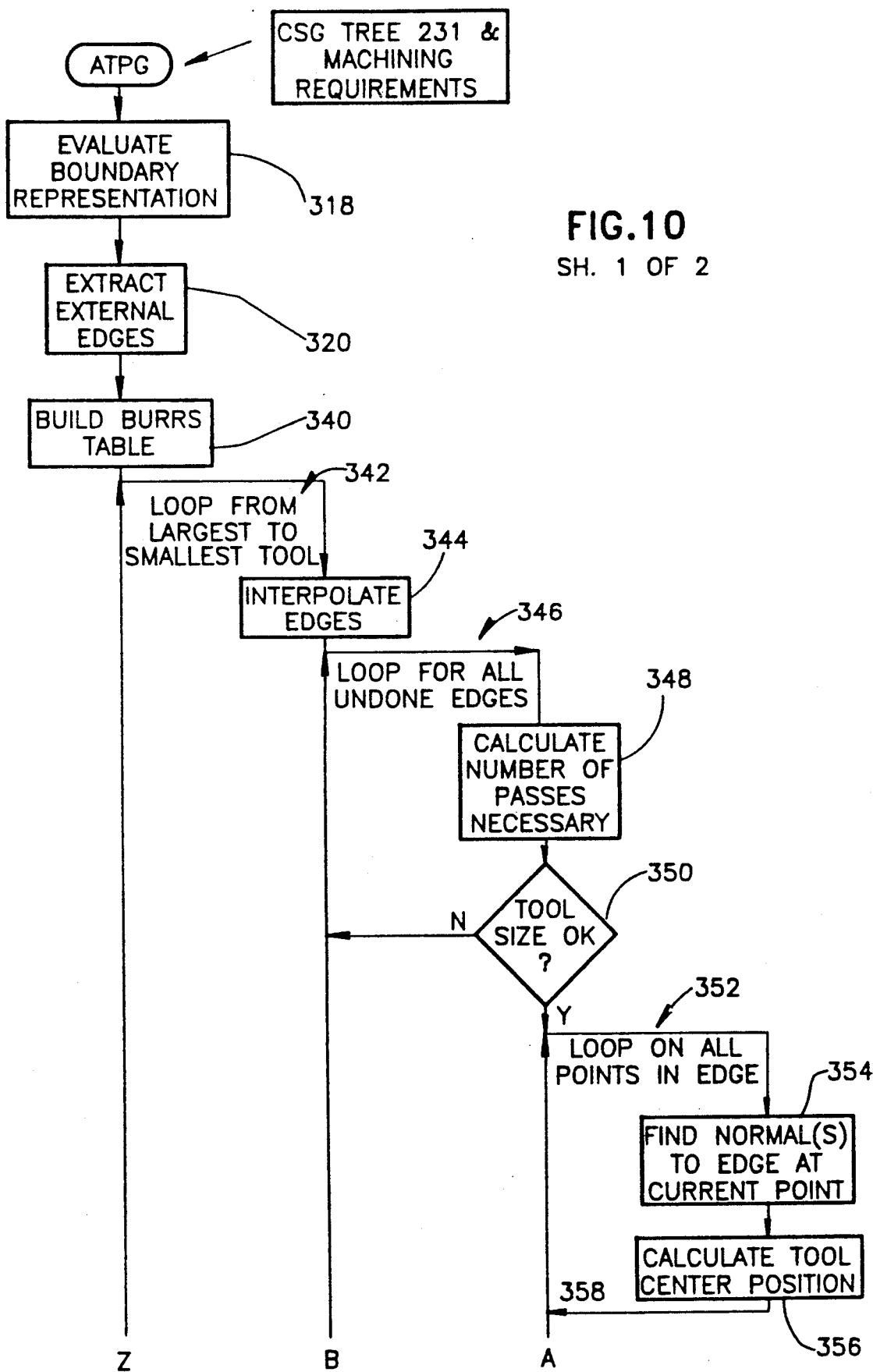
FIG. 10 is a flowchart illustration of a preferred method for automatic tool path generation.

Reference is now made to FIG. 10 which diagrams the operation of the ATPG 216. In the preferred embodiment of the invention, the ATPG 216 generates the optimal, ideal, three dimensional tool path, including tool changes, from the machining requirements of the PCL 214. The system assumes that all external edges, excepting those which the user has canceled in the PCL 214, need to be deburred.

As noted in FIG. 10, the ATPG 216 typically accepts from the PCL 214 the deburring machining requirements as well as a CSG tree 231 description of the workpiece and of the clamping devices, although boundary representation descriptions are also possible.

In step 318, The boundary representation of the workpiece is typically evaluated, producing a complete description of the edges of the workpiece. For every edge, the surfaces that meet at it, its vertices and the other edges that meet at its vertices are found. In addition, the equations of the edge in the x, y, z coordinate system are calculated.

Figure 11A:
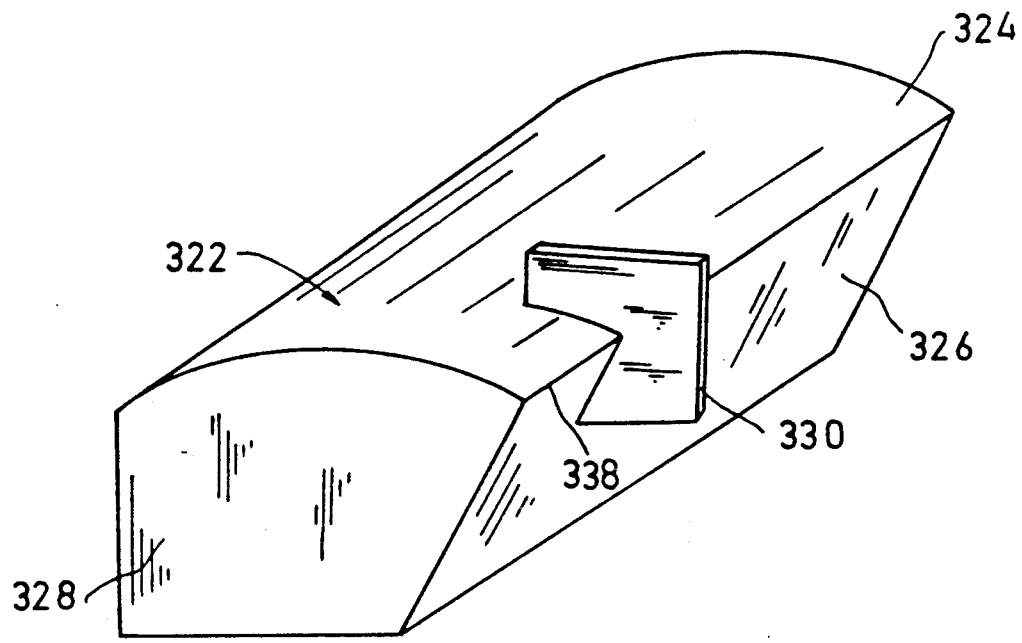
FIG. 11A is an illustration of a plane slicing a workpiece and FIG. 11B is the resultant cross-section useful for the method of FIG. 10.
Figure 11B:
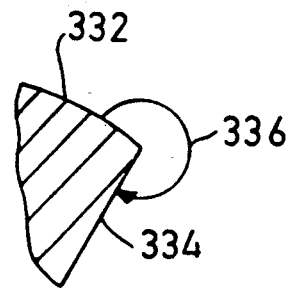

Since burrs only accumulate on sharp edges, known as external edges, in step 320 the external edges are found. To find an external edge, every point along a candidate edge is sliced by a plane perpendicular to it, where the plane is defined by taking the cross product of the normals to the two surfaces at the respective point. FIG. 11 illustrates the process. FIG. 11A shows a solid 322, with three surfaces 324, 326 and 328, sliced by a plane 330. The resultant cross-section is shown in FIG. 11B. The intersection of the plane 330 and surface 324 results in a line 332 and the intersection of the plane 330 and surface 326 results in a line 334. Lines 332 and 334 define an angle external to the solid which is greater than 180°, and thus, the edge of interest, labeled 338 in FIG. 11A, is an external edge. Were angle 336 less than 180°, it would define an internal edge which does not require deburring.

Reference is now made back to FIG. 10. In step 340 a burrs table is built listing all the external edges not deleted by the user where burrs may be found. For each possible burr, the default or user requested values for machining precision, the type of deburring and the size of chamfer or radius of rounding, requested in PCL 214, is recorded. In addition, each possible burr is marked "UNDONE". When the path tool has been generated for a burr, it changes status to "DONE".

In step 342 a loop over the selected subset of the tools chosen in PCL 214, from the tool with the largest sphere radius to that with the smallest, is entered.

In step 344, the edges to be machined are interpolated as linear segments where the distance between any two consecutive points is typically less than half of the radius of the spherical tip of the current tool and the maximum error between the linear approximation of the curve and the actual curve is at most some predetermined small value, typically one micron. If an edge is linear, it is still divided up, however the distance between two consecutive points is typically only half of the radius of the spherical tip of the current tool.

In step 346 a loop over all unfinished edges or segments of edges is entered.

Figure 12:
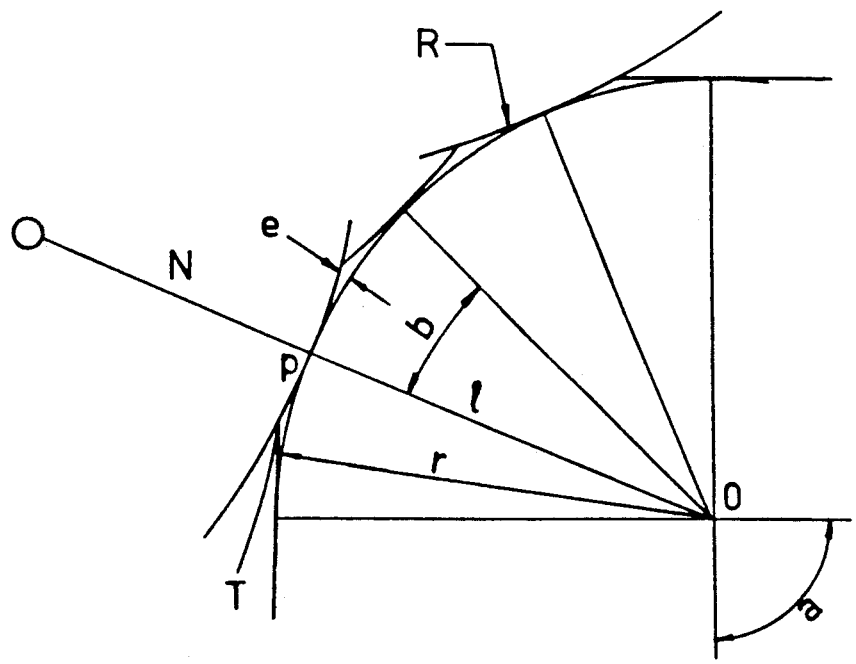
FIG. 12 is an illustration of the geometrical considerations necessary to create a rounded chamfer useful for the method of FIG. 10.

A burr can be removed leaving a straight or a rounded chamfer. For a straight chamfer only one pass is needed. For a rounded chamfer, the rounding radius is approximated as several straight chamfers tangential to the radiu. The number of passes needed to generate the rounding radius depends on the accuracy requested by the user in PCL 214. FIG. 12 illustrates the calculations. Radius r is the requested radius of the chamfer whose center is at point o and radius R is the radius of the spherical tip of the current tool. The tool center position is calculated for each point p. l is a line segment from the point p to the center o of the requested radius. The error between the linear approximation of the curve and the actual curve is e and b is the angular distance between the line segments l of two consecutive passes. The angle between the two surfaces at the edge is 'a'. To calculate the number of passes N necessary to satisfy the requirements of maximum error e being less than some predetermined value, typically one to twenty microns, and radius r being at the user requested value, two additional variables need to be defined. Let b be a variable defined as equal to 'a' divided by N+1 and d be a variable defined as equal to half of b. The necessary number of passes N can be calculated from the following equation:

$$e = (R+r)\cos(d) - \sqrt{R^{}2 - ((R+r)^{}2)^* \sin((d))^{**}2} - r$$

In step 348 the number of passes N is calculated.

It is possible that to create a sufficiently straight chamfer on the current edge the current tool is the incorrect size (e.g. it spherical tip radius is too small). This typically occurs when the cylindrical chamfer produced by moving the spherical tool tip of the current tool along the edge deviates from the desired straight chamfer by more than the accuracy requested. In step 350 the results are checked. If the tool is acceptable, the method proceeds to step 352; if not, the method returns to loop 346 and begins the calculations of step 348 on the next unfinished edge.

In step 352 a loop over all the points in the current edge is entered where the number of points is equal to the number of interpolated points multiplied by the number of passes necessary to produce the requested chamfer shape.

A straight chamfer must, at each point along the edge, be placed symmetrically to the bisector of the normals to the two surfaces which intersect at that point of the edge. The bisector is known as an edge normal. For a rounded edge, produced in N passes where each pass produces a straight chamfer at a different angle, the angle 'a' between the normals to the two surfaces is divided into N equal partial angles. For each partial angle, a bisector, or edge normal, is computed. The edge normal to the current point is calculated in step 354. If a straight chamfer is requested, the calculations are as described hereinbelow and in accordance with FIG. 13A. If, instead, a rounded chamfer is requested, the calculations in step 354 are as described hereinbelow and in accordance with FIG. 13B.

Figure 13A:
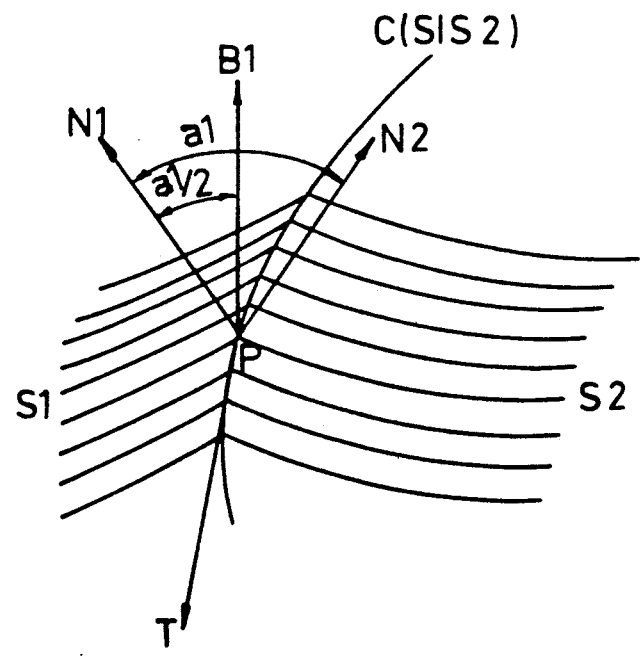
FIG. 13A is three dimensional illustration of two surfaces meeting at an edge.

The calculations for a straight chamfer are as follows and in accordance with FIG. 13A. Two surfaces S1 and S2 meet along an edge C(S1S2), the current edge. At a point P, the current point, the normals N1 and N2 to each surface S1 and S2, respectively, are calculated. An angle a1 between the two normals N1 and N2 is calculated and then bisected to produce an angle bisector B1, which is the required edge normal to the edge C(S1S2) at the point P.

Figure 13B:
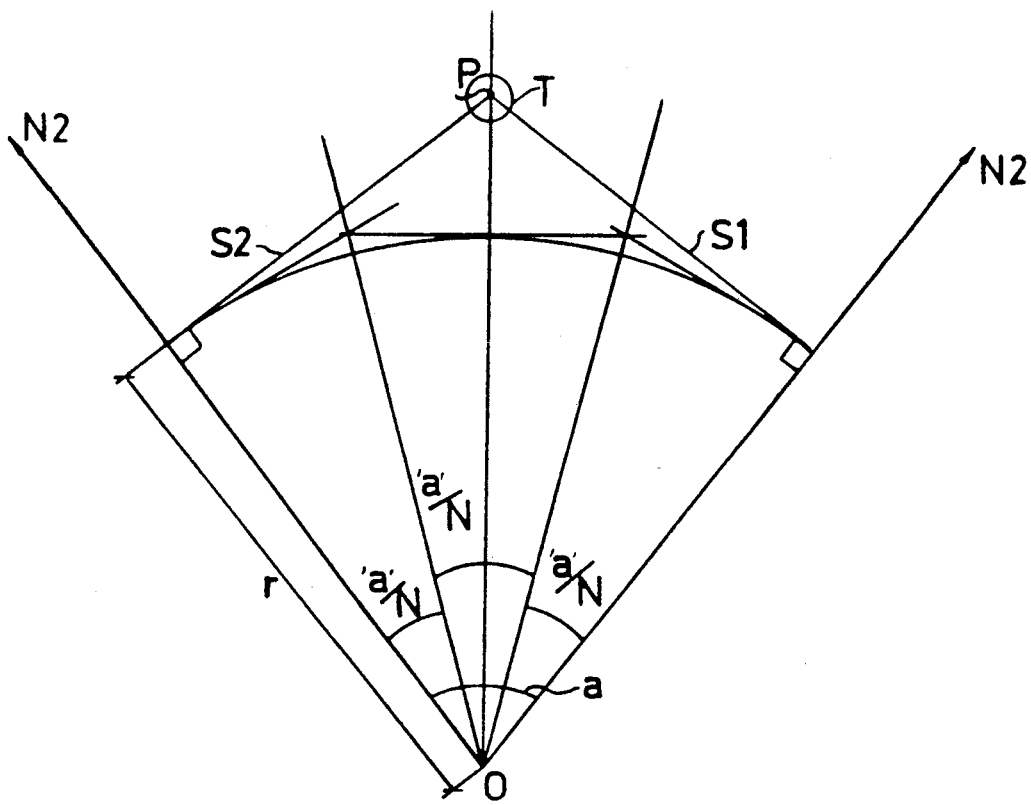
FIG. 13B is a further illustration of the geometrical considerations necessary to create a rounded chamber useful for the method of FIG. 10.

The calculations for a rounded chamfer are as follows and in accordance with FIG. 13B. A tangent T to the surface edge at point P is calculated as the cross product between the two surface normals N1 and N2 at point P. The center point o of the predetermined rounded chamfer radius r is calculated, where the distance oP is equivalent to r/cos('a'/2) and where points o and P are both in the plane defined by the tangent T. The edge normals are calculated as follows. The ith edge normal is in the plane defined by tangent T, between the surface normals N1 and N2, at the angle $(a'*i)/N+1)$ from one of the surface normals N1 or N2 and emanates from center point o. In step 354, one of the edge normals is calculated.

Figure 13C:
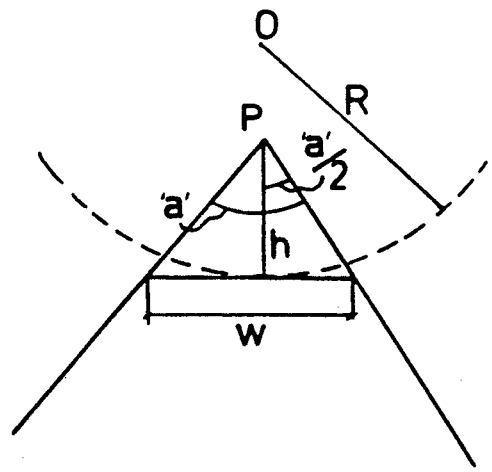
FIG. 13C is an illustration of the geometrical considerations necessary to create a straight chamfer useful for the method of FIG. 10.

The tool center position is calculated in step 356. For a rounded chamfer, the tool center position O is located a distance from the center o of the chamfer equal to sum of the radius r of curvature of the chamfer and the radius R of the tool along the edge normal. For a straight chamfer, the tool center position O is calculated as follows and in accordance with FIG. 13C. Tool center position O is located a distance along normal B1 from point P equal to the radius R of the tool less the chamfer depth h. The chamfer depth h is $w*\cos(a'/2)$ where w is the chamfer width requested in PCL 214.

The loop 352 closes at step 358. At this point, a chain of tool center positions, for a straight chamfer, or a set of chains of tool center positions, one for each pass, for a rounded chamfer, have been calculated for the current edge. The directions of approach for deburring the current edge, if any exist, remain to be found.

In step 360 a loop on all of the available faces is entered. A face is typically unavailable if it has been disabled by the user in PCL 214.

In step 362 a loop on the entirety of tool center positions, as calculated in step 356, is entered.

Figure 14:
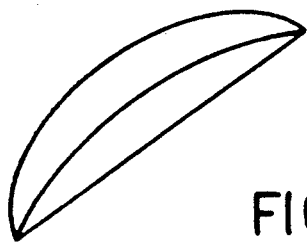
FIG. 14 is an illustration of the solid intersection of a spherical tool with a burr.

In step 364 a CSG boolean intersection between the model of the tool, positioned at the current position with the tool shank oriented perpendicularly to the current face, and the model of the workpiece is performed to check that the tool will not collide with the workpiece, other than at the chamfer location, when located at the current position on the current face. The allowable intersection, shown in FIG. 14, should be a solid which resembles a section of an orange; it arises from the intersection of the volume of the material of the workpiece to be removed with the spherical part of the tool that will remove the material.

Additionally, a CSG boolean intersection operation is performed between the model of the tool, positioned as described hereinabove, and the model of each clamping device selected in PCL 214. If the resultant solid is not empty for any of the clamping devices or if the intersection of the tool and the workpiece is not the allowable solid, then the method proceeds to step 366 and marks the current position as NOT ALLOWED from the current face and with the current tool. The method then returns to loop 362 and repeats the collision check of step 364 on the remaining tool center positions.

If, on the other hand, the intersection of the tool and the entirety of possible clamping devices is empty and the intersection of the tool and the workpiece is the allowable solid, then the method proceeds to step 368 and marks the current position as ALLOWED from the current face. The method then returns to loop 362 and repeats the collision check of step 364 on the remaining tool center positions.

Loops 360 and 362 terminate at step 370, at which point the entirety of tool center positions for deburring the current edge have been marked ALLOWED or NOT ALLOWED for every available face.

In step 372, the method checks that all points on the current edge are deburrable (i.e. that all points on the edge have been marked ALLOWED from at least one face). If the current edge can be deburred from only one face, then the chain or chains of tool positions are recorded, in step 374, in a file for the current tool and the appropriate face, the current edge is marked DONE and the method returns to loop 346 to begin calculations on the next unfinished edge. If the current edge cannot be completely deburred from any face, then the method continues in step 376 as described hereinbelow. If the current edge can be deburred from many faces, then the best face is selected, in step 384, as described hereinbelow.

In step 376 a loop on all available faces is entered. The longest uninterrupted portion of the current edge which can be deburred from the current face is calculated and a check is performed. If a continuous subchain of points of the edge, constituting 50% or more of the total length of the current edge can be deburred from one face, then the method proceeds to step 378 as described hereinbelow. If less than 50% of the current edge can be deburred, then the method proceeds to step 382 as described hereinbelow.

In step 378 the edge is split into and replaced by two or three portions which are added to the list of edges. The portion which can be deburred is marked DONE and the other one or two portions are marked UNDONE. For the portion marked DONE, the chain or chains of tool positions are copied into the corresponding file for the appropriate face and the current tool. The remaining one or two portions continue with the method in step 380.

In step 380 another face is selected for deburring the remainder of the current edge, and the method returns to the start of the loop of step 376.

In step 382 the segment which cannot be deburred from any face is marked UNDONE and the method returns to loop 346.

In step 384 the face which produces the most efficient deburring is selected as follows. The angle between the edge normal through the tool center O and the axis of rotation of the tool is calculated for each tool position and each face. For each face, two calculations are made, 1) the minimum of the plurality of angles and 2) the average of the plurality of angles. The face selected is the one with either the largest minimum angle or, if the minimum for two or more faces are equal, with the largest average angle. It will be appreciated that this method increases the chances of being able to control the spindle RPM so that the edge will be deburred with the correct average surface speed while not exceeding the RPM limit of the spindle.

Upon selecting the face by which to approach the edge, the chain or chains of tool center positions are copied, in step 386, to the corresponding file for that face and the current tool. The edge is marked DONE and the method then returns to loop 346 to continue the calculations for the remaining unfinished edges.

Loop 346 finishes after having produced files of tool positions and approach faces for all of the edges deburrable with the current tool. The ordered set or chain of tool positions for deburring one edge, or a portion of an edge, are known as a tool path. A rounded edge has N tool paths, one for each of the N passes needed to create it.

In step 390, a three-dimensional routing algorithm TDR, discussed in detail hereinbelow, produces optimal connecting tool paths which, for each face separately, connect the tool paths for the individual edges, deburrable by the current tool, to each other, producing one set of three-dimensional tool paths for the current tool. The software also inserts appropriate tool paths for face changes.

In step 391 the method adds tool change paths and commands to release the current tool and accept the next tool, producing three-dimensional tool paths for each of the tools to be used to deburr the workpiece. The tool change paths typically comprise one dimensional movements away from the workpiece in the most recent direction of the tool axis until the tool is completely free of the workpiece. From there, the spindle 41 moves with the tool to the automatic tool changing magazine 26 where the tool is typically changed for the next smallest tool. The spindle 41 and new tool are then moved close to the starting location of the first tool path for the first face and the new tool.

In step 392 the loop 342 finishes.

In step 394 the method concludes, having automatically generated tool paths to entirely deburr one workpiece.

Figure 15:
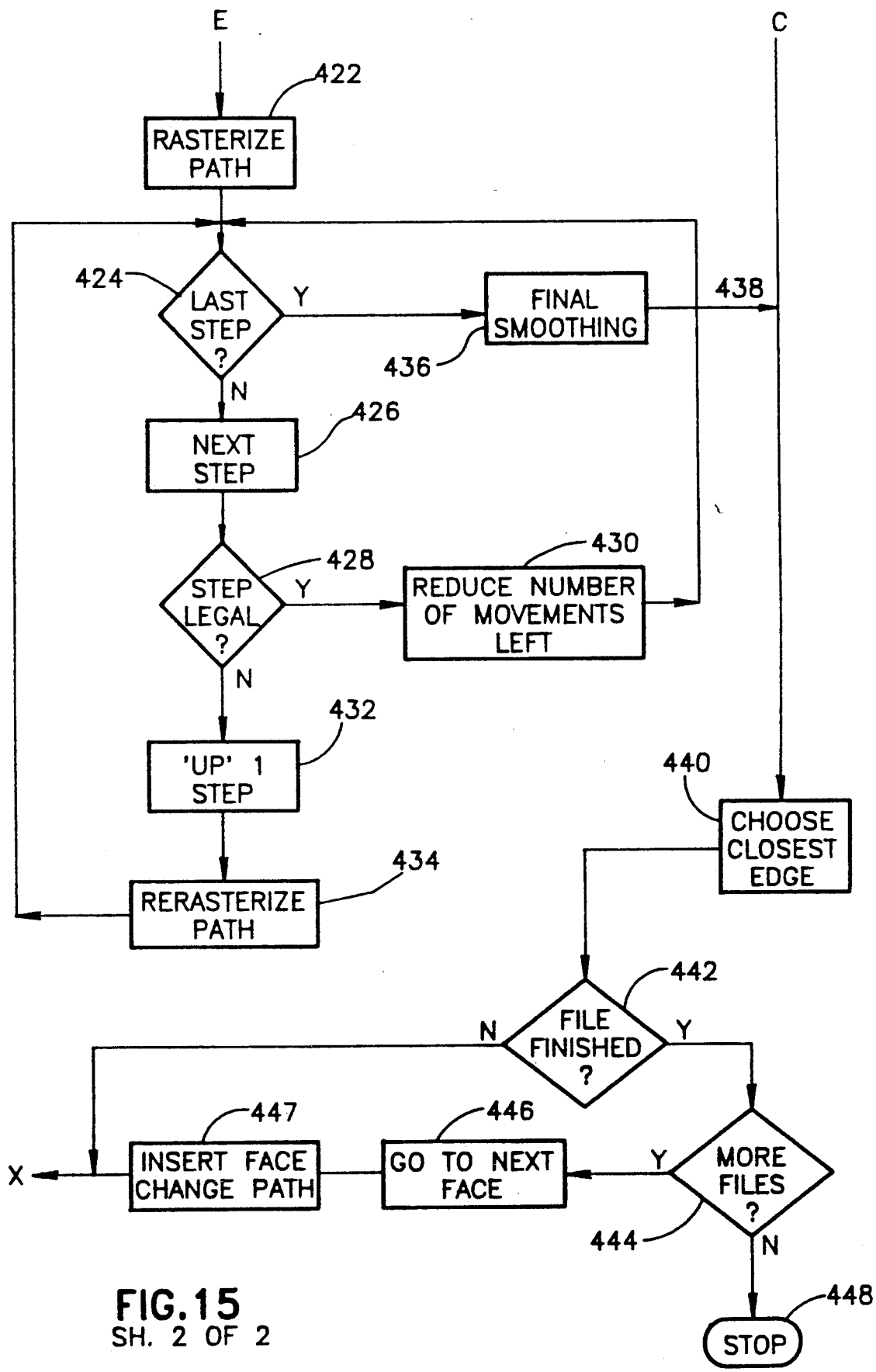
FIG. 15 is a flow chart illustration of a three dimensional routing algorithm useful in the automatic tool path generation of FIG. 10.

Reference is now made to FIG. 15 which outlines the TDR 390 algorithm. The algorithm accepts as input the CSG tree 231 of both the workpiece and of the entirety of clamping devices, generated by PDL 212, and the tool path files generated by ATPG 216. Each of the tool paths in the tool path files is marked UNCONNECTED at the start of the algorithm.

TDR 390 typically begins, in step 396, with a rasterization of the boolean union of the solid representation of the workpiece and the clamping devices. This entails imposing a three-dimensional grid, of sufficiently small elements, on the workpiece and the clamping devices and redefining the solid representation of the workpiece and clamping devices such that all volume elements, or voxels, which contain even a small amount of the material of the workpiece or the clamping devices belong entirely to the new representation of the union of the workpiece and the clamping devices. Thus, the volume of new representation of the workpiece is larger than that of the workpiece itself by at most the size of one grid element in each direction. The grid size is taken as the larger of the maximum diameter of the tool shank and the spherical tip of the tool plus some small clearance value.

Also in step 396, a clear nearest voxel is identified for each starting and ending point of the tool paths for the current face. The clear nearest voxel is typically defined as a voxel, clear of material, which is one of the eight voxels adjacent by face or vertex to the voxel which contains the starting or ending point. If no such voxel exists, the particular tool path cannot be executed and the corresponding segment of the edge of the workpiece is marked UNDONE. The pairs of all points with their associated clear voxels are built into a "targets" list.

In step 398 the current position of the tool is evaluated. Typically, the current position will be at the ending point of a tool path, on a given face. The method will calculate candidate collision free connecting paths to each point in the targets list, being the starting or ending points of each of the unconnected tool paths remaining for the current face, and will select the shortest path.

In step 400 a loop begins over the remaining tool paths for the current face.

In step 402, the straight line distance between the current position and each of the remaining "targets" is calculated.

In step 404, one of the points B or C is chosen and is reflected perpendicularly onto the plane, parallel to the current face, which passes through the other point. The chosen point is the one which is "lower" in the face direction (i.e. further from the "clear plane" than the other point). The coordinates of the new reflected point E are calculated as follows: assuming point B is the "lower" of the two points, E's coordinate in the axis perpendicular to the current face is set to be equal to the corresponding coordinate of point C. The other two coordinates of E are set to be equal to the corresponding coordinates of B.

Figure 16:
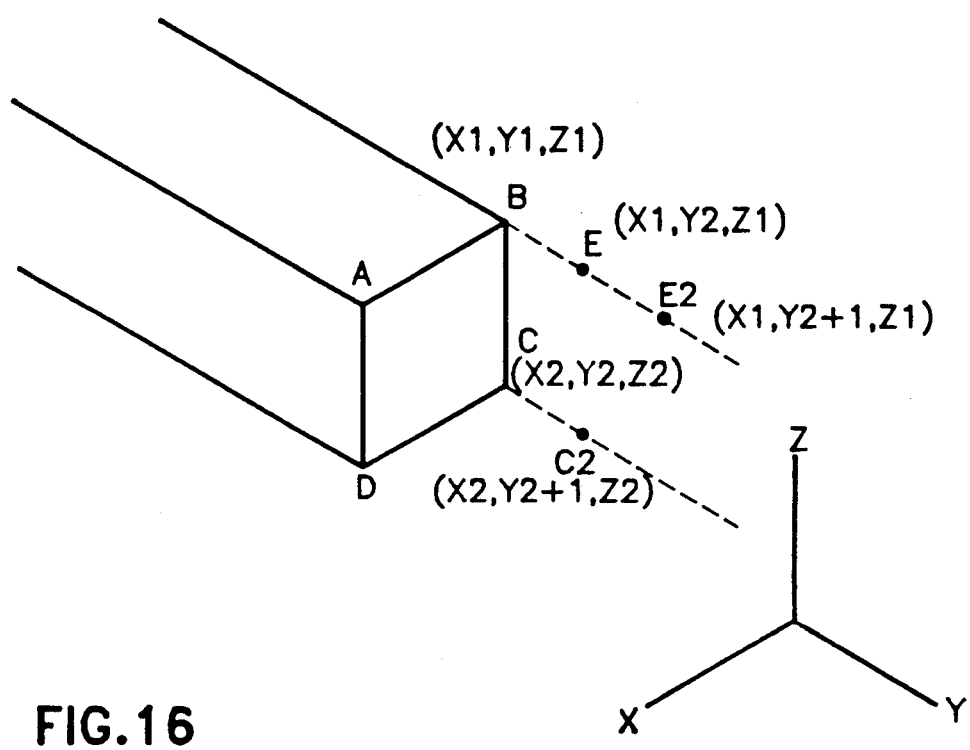
FIG. 16 is a sample geometrical illustration useful in understanding the calculations of FIG. 15.

FIG. 16, a drawing of a simple workpiece with two edges to be deburred, indicates the calculation. Tool path AB is the previous tool path, with B, whose coordinates are (X1,Y1,Z1), being the current position of the tool. Tool path CD is an unconnected tool path, with C, whose coordinates are (X2,Y2,Z2), being the position to be connected to B. The current face is the positive y face which is parallel to the X-Z plane. Thus, the reflected location of point B is E whose Y coordinate Y2, matching that of point C, is equivalent to the larger of the Y values Y1 and Y2. The X and Z coordinates of point E, X1 and Z1 respectively, match those of point B, the position with the smaller Y value. Hence, point E is nearer to the "clearance plane" of the positive y plane, where the "clearance plane" is defined hereinbelow.

For each of the five major directions, corresponding to the five faces, a "clearance plane" is precalculated as follows: a minimal cartesian rectangular bounding box is determined for each of the clamping devices and the workpiece at their theoretical positions and orientations in the machine coordinate system. In each of the x, y and z axes, the minimum and maximum coordinates over the bounding rectangles of each box are determined. The minimum and maximum coordinates become the coordinates of the edges of a global bounding box for the assembly of the workpiece and the clamping devices. For each of the five faces, the corresponding coordinate value of the corresponding edge of the global bounding box is taken (e.g. for the positive x face, the x coordinate of the maximum x edge of the box is taken) and a clearance value, typically 5 mm, is added to or subtracted from it according to whether the face is a positive face or a negative face. The cartesian plane parallel to the face, passing through the new coordinate value thus obtained is defined as the "clearance plane" for the face.

Reference is now made back to FIG. 15. In step 406 a standard two dimensional routing is performed to connect position E to position C with a planar path lying in the X-Z plane passing through E. The two dimensional routing algorithm, which makes use of the planar rasterization grid obtained from the three dimensional rasterization of the union of the workpiece and the clamping devices, can be any of a number of well known algorithms. An example algorithm is described in the article, "An Algorithm for Path Connections and Its Applications," written by C. Y. Lee and published in the *IRE Transactions on Electronic Computers*, September 1961, pp. 346–365.

If the distance covered by the resulting two dimensional path plus the distance from B to E is equivalent in length to the distance covered by the straight line path calculated in step 402, as checked in step 408, then the path from B to E is connected to the two dimensional path and the result is stored in step 410. The method returns to loop 400. If the result of the check of 408 is negative, the calculated path from B to C and its length are stored and the method continues in step 412, as described hereinbelow.

In step 412 the beginning position for the two dimensional routing is moved one grid position, according to the grid calculated in step 396, further away from position B along the axis between B and E, to a position E2 of FIG. 16. The ending position for the two dimensional routing is additionally moved one grid position further away from position C, along an axis parallel to the axis between B and E but passing through C, to a position C2 of FIG. 16.

The two dimensional routing, starting at position E2 and ending at position C2, is performed in step 414, as is a calculation of the length of the path thus found. The length of the path is the sum of the length of the path from B to E2, the length of the two dimensional path from E2 to C2 and the length of the path from C2 to C.

In step 416 the distance calculated in step 414 is compared to the previous solution. If the new distance to be covered is shorter than that of the previous solution, the present solution is stored, in step 418, and the method returns to step 412 to continue the routing calculations until no shorter distances are calculated. If, instead, the distance is longer than that of the previous solution, then the method continues to step 420 as described hereinbelow.

In step 420, the previous solution is chosen as the best connecting path between points B and C.

An attempt is now made to smooth the connecting path. In step 422, the one dimensional movement, the Y axis movement in the case of FIG. 16, and the two dimensional movement, the X-Z plane movement in the case of FIG. 16, are interpolated into equal amounts of small movements.

In step 424, the remaining number of small movements in one direction of movement, either the one-dimensional movement or the two-dimensional movement, is checked. If any still remain, the method continues in step 426. If the entire connecting tool path has been calculated, the method continues to step 436 to perform any final smoothing of the connecting tool path.

In step 426, the next candidate connecting tool path position is calculated. The candidate tool position after B is the position achieved after moving both one small movement along the Y axis towards position E2 and one small X-Z movement away from E2 towards C.

The allowability of the calculated next possible tool position is checked in step 428. If the position interferes with the workpiece defined in step 396 using the volume grid, a finer collision test is performed as in step 364 of ATPG 216. If any collision is detected, either with the workpiece or with the any of the clamping devices, then the position is recalculated in step 432 as described hereinbelow. If the position does not interfere with workpiece then the number of small movements remaining is reduced, in step 430, and the method returns to step 424 to continue calculating the connecting tool path.

In step 432 the next connecting tool path position is defined as the position achieved upon moving one vertical grid dimension in the one dimensional direction, such as in the Y direction in the case of FIG. 16.

In step 434 the remaining one dimensional and two dimensional movements are reinterpolated into an equal number of small movements, where the chosen number is the number of remaining steps in the two dimensional movement, and the method returns to step 424 to continue the connecting tool path calculations.

In step 436 a final smoothing of the connecting tool path is performed. If the connecting tool path contains a consecutive series of equivalent movements, such as one dimensional movements, or movements with the same slope, then the initial and final positions are stored and the interim positions are deleted from the list. After the abovementioned smoothing, the resulting connecting tool path is scanned again. Each consecutive pair of movements, where the first is 'sloped' and the second is 'up', are replaced by one two dimensional movement having the same initial and final positions as the combined pair. The following definitions hold: 'up' is a movement away from the workpiece in the direction perpendicular to the current face, 'across' is a movement along the workpiece in the direction parallel to the current face, and 'sloped' is a movement which is both 'up' and 'across'. It will be noted that the single interim position is then deleted from the connecting path.

The loop 400 terminates at step 438 after producing candidate connecting tool paths from the current tool position to the beginning of all of the remaining tool paths.

In step 440 the shortest candidate connecting tool path is chosen and added after the current tool position. The tool path to which it is connected is marked CONNECTED.

In step 442 the current file is checked. If there are no unconnected tool paths remaining in the file, the method continues in step 444 as described hereinbelow. Otherwise, the method returns to step 398.

If there remain any more files for the current tool, as checked in step 444, the face closest to the current face is chosen, in step 446, and tool paths to effect a face change are inserted, in step 447, at the end of the last tool path to be connected. The tool path for a face change typically comprises a one-dimensional movement away from the workpiece in the most recent direction of the tool axis until the tool is completely free of the workpiece in that direction. The tool tip now lies in the clearance plane of that direction. From there, the spindle 41 is moved, parallel to the current clearance plane, to the nearest point which lies on the line of intersection between the current clearance plane and the clearance plane of the chosen next face. Fourth of fifth axis rotation to the orientation of the next adjacent face is effected and then a two dimensional movement in the new clearance plane is effected to a point directly opposite the starting point of the first tool path of the face. The method returns to step 398 to begin the connecting tool path calculations for the current tool on the next face. If no files remain for the current tool, the method, in step 448, ends, having produced a three dimensional tool path for the current tool It will be appreciated by persons skilled in the art that the present invention is not limited by what has been particularly shown and described hereinabove. The scope of the present invention is defined only by the claims which follow:

We claim:

1. A system for automatic finishing of machined parts comprising:
means for defining a workpiece and finishing parameters thereof corresponding to a finishing task;
means for calculating a three-dimensional tool path along which a finishing tool is drawn in order to perform said finishing task; and means for testing the placement of said workpiece and for correcting said three-dimensional path to account for workpiece misplacement; and finishing means operative to move along said three dimensional path to perfom said finishing task.

2. A system according to claim 1 and wherein said means for defining comprise a solid modeller and a process planner.

3. A system according to claim 2 and wherein said solid modeller utilizes a Constructive Solid Geometry model.

4. A system according to claim 1 and wherein said means for testing and correcting include:

means for defining a plurality of reference surfaces and reference points on an ideally-placed workpiece;

means for calculating an ideal position and orientation from the coordinates of the reference points of said ideally placed workpiece;

means for probing a misplaced workpiece at or near the reference points, thereby defining a plurality of measured reference points;

means for calculating a measured position and orientation from said coordinates of the measured reference points;

means for calculating at least one transformation necessary to transform said ideal position and orientation into said measured position and orientation;

means for calculating a six degree of freedom linear transformation correction matrix based upon said at least one transformation; and means for utilizing said correction matrix to correct in real time said three dimensional tool paths in five axes of motion to compensate for possible workpiece misplacement and misorientation.

5. A system according to claim 4 and wherein said means for probing includes a proximity sensor.

6. A system according to claim 4 and wherein said means for defining a plurality of reference surfaces and reference points utilizes a Constructive Solid Geometry model.

7. A system according to claim 1 and wherein said means for calculating a three-dimensional path include:

means for interpolating, for a given tool, each of a multiplicity of edges into a plurality of edge positions;

means for calculating, for said tool and for each edge, a tool position at each of said plurality of edge positions thereby producing an edge tool path for each edge;

means for selecting an approach direction most appropriate for finishing each of said multiplicity of edges with said tool where a null direction is an appropriate selection if an edge cannot be finished by said tool;

means for repeating said steps of interpolating, calculating and selecting with a set of tools until the entirety of edges have approach directions matched to them; and means for building a three-dimensional path which connects together each of said edge tool paths matched to said approach directions into a complete path around said workpiece which includes paths for tool changes.

8. A system according to claim 7 and wherein said appropriate approach direction is one wherein said given tool, at any of said tool positions of an edge tool path, does not collide with said workpiece, and wherein said given tool can operate at an average surface speed which is correct for said apparatus for finishing.

9. A system according to claim 7 and wherein said means for building includes:

means for rasterizing a model of said workpiece;

means for choosing a first tool location of a connecting path extending from a last location of a previous edge tool path to a beginning location of a candidate next edge tool path, from a given approach direction, wherein said last location and said beginning location each have at least two coordinate elements, said first tool location being chosen as the location whose coordinate element in the approach direction is equivalent to the value of the respective coordinate element of said beginning location and whose remaining coordinate elements are equivalent to the respective coordinate elements of said last location;

means for choosing a first tool location of a connecting path from the end of a previous edge tool path to the beginning of a candidate next edge tool path, from a given approach direction, as the location whose coordinate in the approach direction is equivalent to the value of the respective coordinate of the beginning location of the candidate next edge, and the remaining coordinates are equivalent to their respective values in the final location of the previous tool edge;

means for performing a standard two-dimensional routing from the first tool location of said connecting path to the beginning location of said candidate next edge; means for comparing the results of the steps of choosing and performing against a straight line path between the end of said previous edge tool path to the beginning of said candidate next edge tool path and choosing a first location which is one raster step away from the previous first location, in the opposite approach direction, if said straight line path is shorter;

means for repeating said steps of performing and comparing until said connecting tool path is as short as possible;

means for smoothing said shortest connecting tool path;

means for choosing a shortest candidate connecting tool path; and means for repeating the steps of choosing, performing, comparing, repeating, smoothing, and choosing again, with each of a multiplicity of approach directions.

10. A system according to claim 1 and wherein said means for performing said finishing task comprises a five-dimensional motion assembly and wherein the fifth-axis assembly is removable.

11. A system according to claim 10 and wherein said fifth-axis assembly contains a wholly enclosed motor system.

12. A system according to claim 1 and wherein said means for performing said finishing task includes a tool magazine and interchangeable tools.

13. A system according to claim 12 and wherein said tool magazine holds said interchangeable tools in two tool beds which rotate together.

14. A system according to claim 13 and wherein said tool magazine has a cover thereby to protect said interchangeable tools from metal dust and grit.

15. A system according to claim 1 and wherein said means for performing the finishing task includes a workpiece holder.

16. A system according to claim 15 and wherein said workpiece holder holds 16 workpieces and wherein each workpiece is separately held by a clamp.

17. A system according to claim 16 and wherein said clamp has a stationary lower half and a movable upper half and wherein said upper half is moved by a handle working against springs which, in the resting position, forces said upper half into the clamped position.

18. A system according to claim 1 and wherein said finishing task is a deburring task.

19. A method for automatic finishing of machined parts comprising the steps of:
defining a workpiece and finishing parameters thereof corresponding to a finishing task;
calculating a three-dimensional tool path along which a finishing tool is drawn in order to perform said finishing task; and
testing the placement of said workpiece and for correcting said three-dimensional path to account for workpiece misplacement; and
moving finishing means along said three dimensional path to perform said finishing task.

20. A method according to claim 19 and wherein said step of defining comprise a solid modeller and a process planner.

21. A method according to claim 20 and wherein said solid modeller utilizes a Constructive Solid Geometry model.

22. A method according to claim 19 and wherein said step of testing and correcting includes the steps of:
defining a plurality of reference surfaces and reference points on an ideally-placed workpiece;
calculating an ideal position and orientation from the coordinates of the reference points of said ideally-placed workpiece;
probing a misplaced workpiece at or near the reference points, thereby defining a plurality of measured reference points;
calculating a measured position and orientation from said coordinates of the measured reference points;
calculating at least one transformation necessary to transform said ideal position and orientation into said measured position and orientation; and
calculating a correction matrix based upon said at least one transformation.

23. A method according to claim 22 and wherein said step of defining a plurality of reference surfaces and reference points utilizes a Constructive Solid Geometry model.

24. A method according to claim 19 and wherein said step of calculating a three-dimensional path include the steps of:
interpolating, for a given tool, each of a multiplicity of edges into a plurality of edge positions;
calculating, for said tool and for each edge, a tool position at each of said plurality of edge positions thereby producing an edge tool path for each edge;
selecting an approach direction most appropriate for finishing each of said multiplicity of edges with said tool where a null direction is an appropriate selection if an edge cannot be finished by said tool;
repeating said steps of interpolating, calculating and selecting with a set of tools until the entirety of edges have approach directions matched to them; and
building a three-dimensional path which connects together each of said edge tool paths matched to said approach directions into a complete path around said workpiece which includes paths for tool changes.

25. A method according to claim 24 and wherein said step of building includes the steps of:
rasterizing a model of said workpiece;
choosing a first tool location of a connecting path extending from a last location of a previous edge tool path to a beginning location of a candidate next edge tool path, from a given approach direction, wherein said last location and said beginning location each have at least two coordinate elements, said first tool location being chosen as the location whose coordinate element in the approach direction is equivalent to the value of the respective coordinate element of said beginning location, and whose remaining coordinate elements are equivalent to the respective coordinate elements of said last location;
performing a standard two-dimensional routing from the first tool location of said connecting path to the beginning location of said candidate next edge;
comparing the results of the steps of choosing and performing against a straight line path between the end of said previous edge tool path to the beginning of said candidate next edge tool path and choosing a first location which is one raster step away from the previous first location, in the opposite approach direction, if said straight line path is shorter;
repeating said steps of performing and comparing until said connecting tool path is as short as possible;
smoothing said shortest connecting tool path; choosing a shortest candidate connecting tool path; and
repeating the steps of choosing, performing, comparing, repeating, smoothing, and choosing again, with each of a multiplicity of approach directions.

* * * * *